(12) United States Patent
Ball et al.

(10) Patent No.: US 12,129,631 B2
(45) Date of Patent: *Oct. 29, 2024

(54) HYDRANT ENCLOSURE WITH INTEGRAL FAUCET

(71) Applicant: WCM Industries, Inc., Colorado Springs, CO (US)

(72) Inventors: William T. Ball, Colorado Springs, CO (US); Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,232

(22) Filed: Aug. 2, 2023

(65) Prior Publication Data

US 2023/0374761 A1 Nov. 23, 2023

Related U.S. Application Data

(60) Continuation of application No. 17/686,652, filed on Mar. 4, 2022, now Pat. No. 11,761,178, which is a continuation of application No. 16/799,508, filed on Feb. 24, 2020, now Pat. No. 11,299,874, which is a continuation of application No. 15/416,179, filed on Jan. 26, 2017, now Pat. No. 10,570,590, which is a continuation-in-part of application No. 29/570,362, filed on Jul. 7, 2016, now Pat. No. Des. 788,887, and a continuation-in-part of application No. 29/569,524, filed on Jun. 28, 2016, now Pat. No. Des. 829,868, and a continuation-in-part of application No. 29/569,527, filed on Jun. 28, 2016, now Pat. No. Des. 827,785, and a continuation-in-part of application (Continued)

(51) Int. Cl.
| | |
|---|---|
| E03B 9/02 | (2006.01) |
| E03B 9/10 | (2006.01) |
| F16K 27/00 | (2006.01) |
| F16K 31/46 | (2006.01) |
| F16K 35/10 | (2006.01) |
| E03B 7/09 | (2006.01) |

(52) U.S. Cl.
CPC ............... *E03B 9/025* (2013.01); *E03B 9/10* (2013.01); *F16K 27/006* (2013.01); *F16K 31/46* (2013.01); *F16K 35/10* (2013.01); *E03B 7/095* (2013.01); *Y10T 137/5468* (2015.04); *Y10T 137/7043* (2015.04); *Y10T 137/7062* (2015.04)

(58) Field of Classification Search
CPC ........ F16L 35/00; A62C 35/20; F16K 27/006; E03B 9/10; E03B 9/025; E03B 7/095; Y10T 137/698; Y10T 137/7043; Y10T 137/7062; Y10T 137/7065
See application file for complete search history.

(56) References Cited

U.S. PATENT DOCUMENTS

| | | |
|---|---|---|
| 1,086,841 A | 2/1914 | Mueller |
| 2,669,499 A | 2/1954 | Vanderplank |

(Continued)

*Primary Examiner* — Reinaldo Sanchez-Medina
*Assistant Examiner* — Nicole Gardner

(57) ABSTRACT

Provided is an enclosure with an integrated hydrant. The enclosure includes a fluid flow conduit that transfers fluid from a fluid supply tube to a fluid outlet, which may be associated with the backflow preventer. The enclosure has a conduit that carries water from the fluid supply tube to the backflow preventer. Thus, a lower profile, lighter, and more aesthetically pleasing enclosure is provided.

20 Claims, 31 Drawing Sheets

Related U.S. Application Data

No. 29/569,533, filed on Jun. 28, 2016, now Pat. No. Des. 818,565, said application No. 29/570,362 is a division of application No. 29/529,465, filed on Jun. 8, 2015, now abandoned, said application No. 15/416,179 is a continuation of application No. 14/710,350, filed on May 12, 2015, now Pat. No. 9,580,891, said application No. 29/569,524 is a continuation of application No. 29/519,956, filed on Mar. 9, 2015, now Pat. No. Des. 762,824, said application No. 14/710,350 is a continuation-in-part of application No. 29/519,956, filed on Mar. 9, 2015, now Pat. No. Des. 762,824, and a continuation-in-part of application No. 29/519,957, filed on Mar. 9, 2015, now Pat. No. Des. 768,829, said application No. 29/569,527 is a continuation of application No. 29/519,957, filed on Mar. 9, 2015, now Pat. No. Des. 768,829, said application No. 14/710,350 is a continuation-in-part of application No. 29/519,131, filed on Mar. 2, 2015, now Pat. No. Des. 760,874, said application No. 29/569,533 is a continuation of application No. 29/519,131, filed on Mar. 2, 2015, now Pat. No. Des. 760,874, said application No. 14/710,350 is a continuation-in-part of application No. 29/514,307, filed on Jan. 10, 2015, now Pat. No. Des. 733,845, and a continuation-in-part of application No. 29/514,308, filed on Jan. 10, 2015, now Pat. No. Des. 737,942, and a continuation-in-part of application No. 29/503,653, filed on Sep. 29, 2014, now Pat. No. Des. 729,353, and a continuation-in-part of application No. 29/503,651, filed on Sep. 29, 2014, now Pat. No. Des. 729,352, and a continuation-in-part of application No. 14/317,627, filed on Jun. 27, 2014, now Pat. No. 9,533,180.

(60) Provisional application No. 61/841,597, filed on Jul. 1, 2013.

(56) References Cited

U.S. PATENT DOCUMENTS

| | | |
|---|---|---|
| D180,010 S | 4/1957 | Britton |
| 3,250,915 A | 5/1966 | Schmitt |
| D216,791 S | 3/1970 | Woodford |
| D228,554 S | 10/1973 | Magorien |
| 3,952,770 A | 4/1976 | Botnick |
| D245,255 S | 8/1977 | Porter |
| 4,178,956 A | 12/1979 | Fillman |
| 4,286,616 A | 9/1981 | Botnick |
| D275,616 S | 9/1984 | Gray |
| D283,204 S | 4/1986 | McDonald |
| D285,824 S | 9/1986 | Anderson |
| 4,844,116 A | 7/1989 | Buehler |
| D311,767 S | 10/1990 | Beall |
| D312,122 S | 11/1990 | Veillette |
| D313,920 S | 1/1991 | Rudick |
| D318,718 S | 7/1991 | Blatt |
| 5,614,119 A | 3/1997 | Ollis |
| D382,941 S | 8/1997 | Nortier |
| 5,964,246 A | 10/1999 | Meeker |
| 6,062,254 A | 5/2000 | Brady et al. |
| D456,877 S | 5/2002 | Wilder et al. |
| D470,915 S | 2/2003 | Ball |
| D482,431 S | 11/2003 | Ball |
| 6,752,167 B1 | 6/2004 | Stanaland et al. |
| 6,948,512 B2 | 9/2005 | McKeague |
| 7,395,834 B1 | 7/2008 | Lawson |
| D578,209 S | 10/2008 | Schurg et al. |
| 7,543,602 B2 | 6/2009 | Ball |
| 7,607,453 B2 | 10/2009 | Poskin |
| D606,162 S | 12/2009 | McAvey et al. |
| D609,782 S | 2/2010 | Whatley |
| D612,465 S | 3/2010 | Salser et al. |
| D614,736 S | 4/2010 | Freiler |
| 8,042,565 B2 | 10/2011 | Ball et al. |
| D656,223 S | 3/2012 | Cronje et al. |
| 8,210,198 B1 | 7/2012 | Majocka |
| 8,353,309 B1 | 1/2013 | Embry et al. |
| D675,714 S | 2/2013 | Nguyen |
| D676,527 S | 2/2013 | Xue et al. |
| D680,621 S | 4/2013 | Foster |
| D681,782 S | 5/2013 | Bohm et al. |
| D681,784 S | 5/2013 | Liljegren et al. |
| D685,906 S | 7/2013 | Dale et al. |
| D702,320 S | 4/2014 | Pifer |
| D708,303 S | 7/2014 | Gehrling |
| D711,510 S | 8/2014 | Halldorsson |
| D715,405 S | 10/2014 | McAlpine |
| D717,404 S | 11/2014 | Bailey et al. |
| D720,046 S | 12/2014 | Morodomi et al. |
| D721,787 S | 1/2015 | Yoshimura et al. |
| D721,788 S | 1/2015 | Pifer |
| D722,674 S | 2/2015 | Lipkens et al. |
| D722,676 S | 2/2015 | Gaertner |
| 8,973,599 B2 | 3/2015 | Stanaland |
| D728,748 S | 5/2015 | Gehrling |
| D729,352 S | 5/2015 | Ball et al. |
| D729,353 S | 5/2015 | Ball et al. |
| D733,844 S | 7/2015 | Ball et al. |
| D733,845 S | 7/2015 | Ball et al. |
| D737,942 S | 9/2015 | Ball et al. |
| D757,900 S | 5/2016 | Yakushijin et al. |
| D760,874 S | 7/2016 | Ball et al. |
| D762,824 S | 8/2016 | Ball et al. |
| D764,026 S | 8/2016 | Mills et al. |
| D766,401 S | 9/2016 | Zhu et al. |
| D768,829 S | 10/2016 | Ball et al. |
| 9,533,180 B2 | 1/2017 | Ball et al. |
| 9,580,891 B2 | 2/2017 | Ball |
| D788,887 S | 6/2017 | Ball et al. |
| D818,565 S | 5/2018 | Ball |
| D827,785 S | 9/2018 | Ball |
| D829,868 S | 10/2018 | Ball |
| D841,131 S | 2/2019 | Ball |
| D841,132 S | 2/2019 | Ball |
| D848,582 S | 5/2019 | Ball |
| D861,835 S | 10/2019 | Ball |
| 2004/0000337 A1 | 1/2004 | Cooper |
| 2006/0086921 A1 | 4/2006 | Ball |
| 2006/0201553 A1 | 9/2006 | Poskin |
| 2007/0186889 A1 | 8/2007 | Schweiger |
| 2010/0002490 A1 | 2/2010 | Polgati et al. |
| 2011/0062834 A1 | 3/2011 | Ball et al. |
| 2011/0115215 A1 | 5/2011 | Cronje et al. |
| 2014/0202558 A1 | 7/2014 | Chou et al. |
| 2014/0305516 A1 | 10/2014 | Stanaland |
| 2016/0258141 A1 | 9/2016 | Stanaland |
| 2017/0138024 A1 | 5/2017 | Ball et al. |

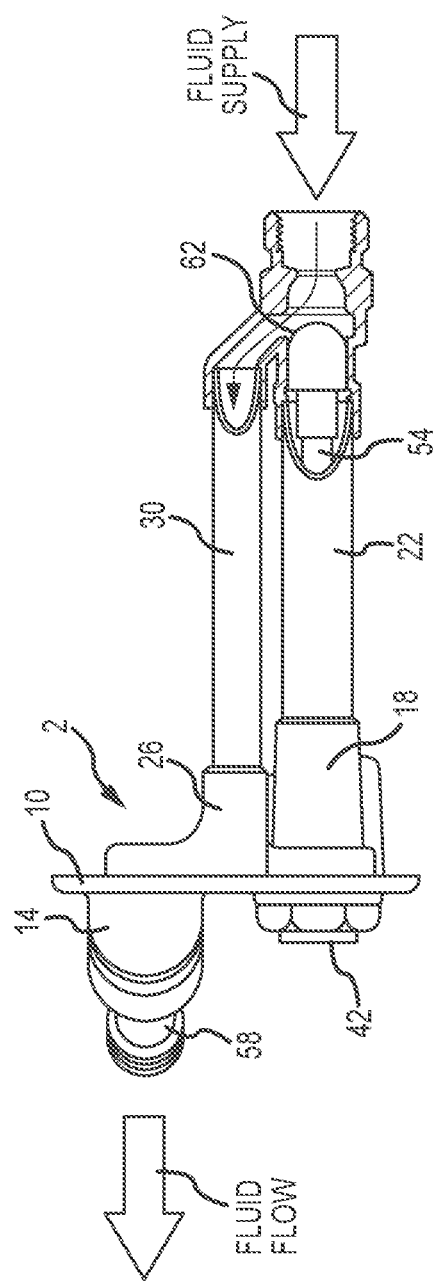
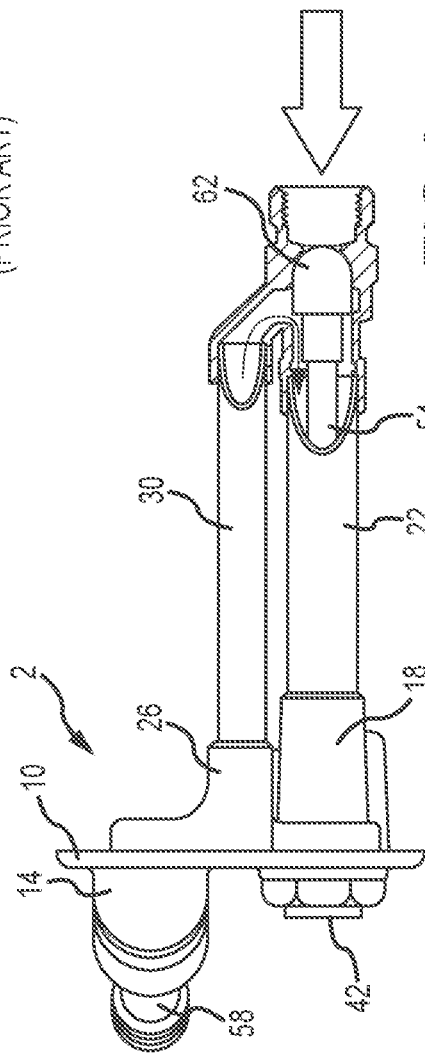
FIG. 2 (PRIOR ART)
FIG. 3 (PRIOR ART)

HYDRANT ENCLOSURE WITH INTEGRAL FAUCET

This application is a continuation of U.S. patent application Ser. No. 17/686,652, filed Mar. 4, 2022, which is a continuation of U.S. patent application Ser. No. 16/799,508, filed Feb. 24, 2020, now Issued U.S. Pat. No. 11,299,874 which is a is a continuation of U.S. patent application Ser. No. 15/416,179, filed Jan. 26, 2017, now U.S. Pat. No. 10,570,590, which is a continuation of U.S. patent application Ser. No. 14/710,350, filed May 12, 2015, now U.S. Pat. No. 9,580,891, which is a continuation-in-part of U.S. patent application Ser. No. 14/317,627, filed Jun. 27, 2014, now U.S. Pat. No. 9,533,180, issued Jan. 3, 2017, which claims the benefit of U.S. Provisional Patent Application Ser. No. 61/841,597, filed Jul. 1, 2013, the entire disclosures of which are incorporated by reference herein.

U.S. patent application Ser. No. 15/416,179 is also a continuation-in-part of U.S. patent application Ser. No. 29/569,524, filed Jun. 28, 2016, now U.S. Pat. No. D829,868, which is a continuation-in-part of U.S. patent application Ser. No. 29/519,956, filed Mar. 9, 2015, now U.S. Pat. No. D762,824, issued Aug. 2, 2016 the entire disclosures of which are incorporated by reference herein.

U.S. patent application Ser. No. 15/416,179 is also a continuation-in-part of U.S. patent application Ser. No. 29/569,527, filed Jun. 28, 2016, now U.S. Pat. No. D827,785, which is a continuation of U.S. patent application Ser. No. 29/519,957, filed Mar. 9, 2015, now U.S. Pat. No. D768,829, issued Oct. 11, 2016 the entire disclosures of which are incorporated by reference herein U.S. patent application Ser. No. 15/416,179 is also a continuation-in-part of U.S. patent application Ser. No. 29/569,533, filed Jun. 28, 2016, now U.S. Pat. No. D818,565, which is a continuation of U.S. patent application Ser. No. 29/519,131, filed Mar. 2, 2015, now U.S. Pat. No. D760,874, issued Jul. 5, 2016, the entire disclosures of which are incorporated by reference herein.

U.S. patent application Ser. No. 15/416,179 is also a continuation-in-part of U.S. patent application Ser. No. 29/570,362, filed Jul. 7, 2016, now U.S. Pat. No. D788,887, which is a divisional of abandoned U.S. patent application Ser. No. 29/529,465, filed Jun. 8, 2015, the entire disclosures of which are incorporated by reference herein.

U.S. application Ser. No. 14/710,350 is also a continuation-in-part of U.S. patent application Ser. No. 29/503,651, filed Sep. 29, 2014, now U.S. Pat. No. D729,352, issued May 12, 2015, the entire disclosures of which are incorporated by reference herein.

U.S. application Ser. No. 14/710,350 is also a continuation-in-part of U.S. patent application Ser. No. 29/503,653, filed Sep. 29, 2014, now U.S. Pat. No. D729,353, issued May 12, 2015, the entire disclosures of which are incorporated by reference herein.

U.S. application Ser. No. 14/710,350, is also a continuation-in-part of U.S. patent application Ser. No. 29/514,306, filed Jan. 10, 2015, now U.S. Pat. No. D733,844, issued Jul. 7, 2015, the entire disclosures of which are incorporated by reference herein.

U.S. application Ser. No. 14/710,350, is also a continuation-in-part of U.S. application patent Ser. No. 29/514,307, filed Jan. 10, 2015, now U.S. Pat. No. D733,845, issued Jul. 7, 2015, the entire disclosures of which are incorporated by reference herein.

U.S. application Ser. No. 14/710,350, is also a continuation-in-part of U.S. patent application Ser. No. 29/514,308, filed Jan. 10, 2015, now U.S. Pat. No. D737,942, issued Sep. 1, 2015, the entire disclosures of which are incorporated by reference herein.

U.S. application Ser. No. 14/710,350, is also a continuation-in-part of U.S. patent application Ser. No. 29/519,131, filed Mar. 2, 2015, now U.S. Pat. No. D760,874, issued Jul. 5, 2016, the entire disclosures of which are incorporated by reference herein.

U.S. application Ser. No. 14/710,350, is also a continuation-in-part of U.S. patent application Ser. No. 29/519,956, filed Mar. 9, 2015, now U.S. Pat. No. D762,824, issued Aug. 2, 2016, the entire disclosures of which are incorporated by reference herein.

U.S. application Ser. No. 14/710,350, is also a continuation-in-part of U.S. patent application Ser. No. 29/519,957, filed Mar. 9, 2015, now U.S. Pat. No. D768,829, issued Oct. 11, 2016 the entire disclosures of which are incorporated by reference herein.

FIELD OF THE INVENTION

Embodiments of the present invention are generally related to an enclosure for concealing and protecting a hydrant. Some embodiments of the present invention are related to hydrants having a face plate with an integrated door.

BACKGROUND OF THE INVENTION

Wall hydrants generally comprise a support plate that abuts a wall of a structure, a hose bib extending from the plate, a means to control fluid flow through the hose bib, a fluid supply tube, a valve, and a tube that contains a mechanism operates the valve.

Those of skill in the art will appreciate that the fluid supply tube can also include the means to control the fluid flow. Hydrants are also commonly known as "outdoor faucets."

Protective enclosures that conceal and protect hydrants are sometimes incorporated into interior or exterior building walls. Enclosures are generally comprised of a box that surrounds the hose bib and control means and an interconnected door. The enclosure prevents hydrant operation, prevents theft of hydrant components (e.g., brass), protects the hydrant from the elements (i.e., salt air), and provides a wall support that firmly interconnects the hydrant to a structure. The enclosure door is interconnected to an outer edge of the box and may be selectively locked.

Enclosures are made in various sizes and shapes, and may accommodate a single or dual hydrant that carries hot and cold water, for example. Existing enclosures are rigidly mounted to a wall and are difficult to replace. For example, if an enclosure is in need of repair, the hydrant must first be disconnected and removed. Then, the box must be removed from the wall. One of skill the art will appreciate that this method of repair is labor intensive, time consuming, and inefficient as often only the door is damaged. In addition, keys that are used to open door locks are often lost, which causes maintenance personnel to pry the door open, which damages the door. Thereafter, the door or entire enclosure must be replaced to ensure that the door can be locked or closed properly.

Referring now to FIGS. 1-6 a wall hydrant 2 and associated enclosure 66 of the prior art is shown. The hydrant 2 comprises a plate 10 that supports a fluid outlet 14 and a plurality of tube bosses extending therefrom. A control tube boss 18 receives a control tube 22, and a fluid tube boss 26 receives a fluid supply tube 30. The fluid supply tube and the control tube are connected to their respective bosses and to a valve 34. An outside surface of the plate 10 includes an aperture 42 that receives a key 46 that is selectively interconnected to a stem screw 50. The key controls the flow of water by way of a control rod 54. The outside surface of the plate 10 also includes the fluid outlet 14, which may be interconnected to backflow preventer 58. A backflow preventer used by some embodiments is disclosed in U.S. Pat. No. 8,042,565, which is incorporated by reference herein. As one of ordinary skill in the art will appreciate, the interconnection of the plate 10 to the back wall of the enclosure constitutes a leak point, wherein water can infiltrate the space behind the enclosure and can damage the structure to which the enclosure is attached and become a mold issue.

In operation, the user interconnects the key 46 to the stem screw 50, which is operatively interconnected to the control rod 54. Turning the key 46 moves the control rod 54 which moves the plunger 62 away from a valve 34 to allow fluid flow through the fluid supply tube 30 as shown in FIG. 2. When the key 46 is turned in the opposite direction, the control rod 54 will move the plunger 62 into engagement with the valve 34 as shown in FIG. 3, which prevents fluid flow through the fluid supply tube 30.

The enclosure 66 that receives the wall hydrant is shown in FIGS. 4-6. The enclosure 66 comprises a box 70 and a door 74. In some applications the box 70 is of sufficient depth to receive a plate 10 and interconnected backflow preventer 58. If a shallow box is used, the wall hydrant and interconnected components may be accommodated by a bulge in the door, as shown in FIG. 5, for example. The key 46 may also be left interconnected to the stem screw 50 in some instances. The depth of the box 70 allows for the door 74 to be closed to conceal the entire wall hydrant 2 and included backflow preventer 58. The plate is integrated to, bolted, or otherwise interconnected to a rear surface of the box.

Of course, exiting enclosures are an added wall hydrant installation component that requires additional material and adds cost and complexity to the overall system. Further, those of ordinary skill in the art will appreciate that prior art enclosures are made of brass or stainless steel and are, thus, heavy. This added weight renders the enclosure cumbersome and difficult to install.

Those of ordinary skill in the art will also appreciate enclosures are difficult to use. More specifically, because the plate 10 and associated backflow preventer 58 are spaced from a front edge 78 of the box 70, it is often difficult for some users to get a hand into the box to connect a back flow preventer, a hose, and engage the key 46 or turn a knob to initiate fluid flow. Further, if the door 74 is damaged, the entire enclosure 66 must be removed.

It is thus a long felt need to provide a hydrant enclosure that is easy to install, easy to use, and that accepts various types of fluid connections. Those of skill in the art will also appreciate that it would be advantageous to provide a hydrant enclosure with a replaceable door. These and other features, alone or in combination, are provided by the embodiments the present invention, which will be described below.

SUMMARY OF THE INVENTION

It is one aspect of embodiments of the present invention to provide an enclosure with an integrated hydrant. More specifically, one embodiment is a hydrant enclosure comprising a plate. A door is operatively interconnected to the plate. The plate also includes at least one cavity recessed relative to a plate that allows for larger components, such as backflow preventers and control knobs, to be accommodated when the enclosure door is closed. Some embodiments of the present invention do not employ cavities, but accommodate larger components associated with a wall hydrant with a larger door. The enclosure of this embodiment is smaller, more compact, and lighter than those of the prior art. Further, the wall hydrant with an integrated door as contemplated herein mounts to building surfaces in substantially the same way as traditional wall hydrants are incorporated into structures.

It is another aspect of embodiments of the present invention to provide an enclosure that saves material. More specifically, the fluid control tube and fluid delivery tube are directly interconnected to the box and a traditional support plate (also known as a "face plate") is omitted. Further, the recess is in fluidic communication with a fluid supply boss. Unlike the prior art systems, the fluid supply boss is interconnected to a conduit integrated into the box that provides fluid to the recess that receives a backflow preventer. Materials, such as brass, steel, iron, etc. commonly associated with prior hydrant plates are integrated directly into the enclosure plate, thus significant material savings are realized.

It is yet another aspect of embodiments of the present invention to provide an enclosure with a selectively removable door. Those of skill in the art will appreciate that the door will wear or be damaged. Instead of removing the enclosure from the wall, embodiments of the present invention allow the door to be removed from the enclosure and replaced. The door may be interconnected to a lip extending from the plate. The door may also be fastened to the plate outer surface and selectively interconnected thereto which allows door replacement.

It is still yet another aspect of embodiments the present invention to provide an aesthetically pleasing enclosure door. More specifically, the size of the hydrant enclosure and associated door may be modified to accommodate larger hydrants. The door may also be made to correspond to the dimensions and character of building materials, such as stone or brick. In one embodiment, an outer surface of the door is textured or painted to match brick, stone, stucco, or siding such that the hydrant is substantially hidden when not in use.

These and other advantages will be apparent from the disclosure of the invention(s) described herein. The above-described embodiments, objectives, and configurations are neither complete nor exhaustive. As will be appreciated, other embodiments of the invention are possible using, alone, or in combination, one or more of the features set forth above or described below. Further, The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 2 is a top elevation view of FIG. 1, wherein fluid is shown exiting the hydrant;

FIG. 3 is a top elevation view of FIG. 1, wherein fluid is not flowing from the hydrant;

Figure 1:
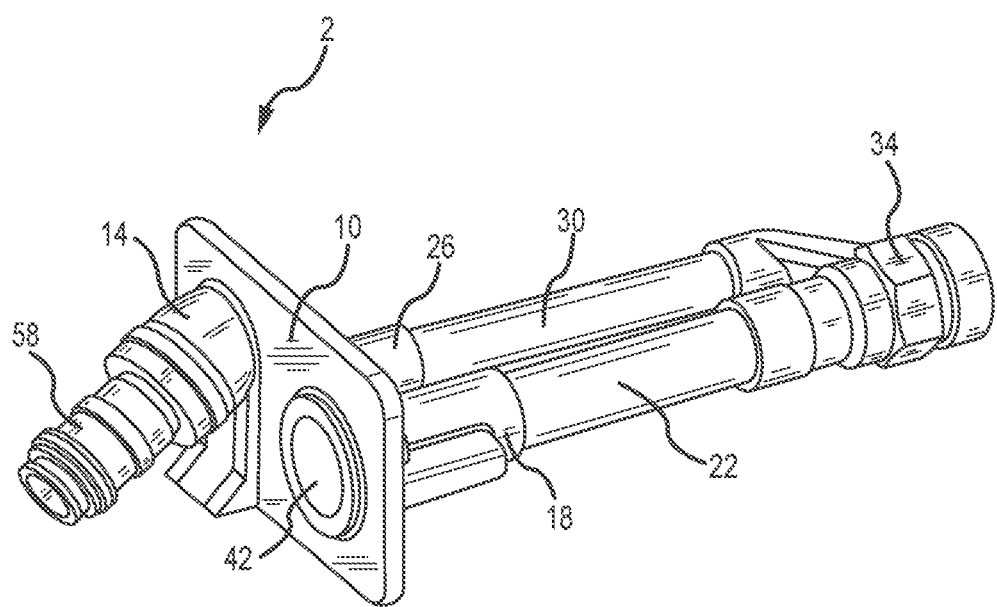
FIG. 1 is a perspective view of a prior art hydrant.

To assist in the understanding of one embodiment of the present invention the following list of components and associated numbering found in the drawings is provided herein:

COMPONENT

2 Hydrant
6 Enclosure
10 Plate
14 Fluid outlet
18 Controlled tube boss
22 Control tube
26 Fluid tube boss
30 Fluid supply tube
34 Valve
42 Aperture
46 Key
50 Stem screw
54 Control Rod
58 Backflow preventer
62 Plunger
66 Enclosure
70 Box
74 Door
76 Lock
78 Front edge
100 Enclosure
104 Plate
106 Recess
108 Lip
112 Inner surface
114 Hose bib
116 Outer surface
120 Backflow preventer
124 Opening
128 Stem screw
132 Protrusion
136 Conduit
140 Fluid supply tube
144 Valve
148 Boss
152 Control tube
162 Door 166 Hinge plate
170 Protrusions
174 Fasteners
178 Lock
182 Protrusion
188 Inner surface
192 Lip
200 Enclosure
206 Recess
212 Inner surface
216 Outer surface
220 Backflow preventer
224 Opening
228 Stem screw
232 Protrusion
236 Conduit
240 Fluid supply tube
244 Valve
248 Boss
252 Control tube
262 Door
278 Lock
292 Lip
294 Pin
298 Fluid flow path
300 Enclosure
306 Recess
312 Plate
314 Hinge
320 Backflow preventer
324 Opening
328 Stem screw
332 Protrusion
340 Fluid supply tube
344 Valve
352 Control tube
362 Door
378 Lock
392 Lip
400 Enclosure
406 Recess
412 Plate
414 Hinge
420 Backflow preventer
424 Opening
428 Stem screw
432 Protrusion
440 Fluid supply tube
444 Valve
452 Control tube
462 Door
478 Lock
492 Lip
496 Hinge plate
498 Fasteners
500 Enclosure
506 Recess
508 Lip
512 Plate
520 Backflow preventer
528 Stem screw
532 Protrusion
540 Fluid supply tube
544 Valve
552 Control tube
562 Door
564 Pocket
578 Lock
592 Lip
600 Hydrant
602 Housing
606 Fasteners
612 Plate
614 Hinge
620 Backflow preventer
628 Stem screw
640 Fluid supply and control tube
644 Valve
662 Door
664 Hinge plate
678 Lock
692 Lip It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 7-11 show an enclosure 100 with an integrated hydrant of one embodiment of the present invention. The enclosure 100 is defined by a plate 104 with an outwardly-extending lip 108. The plate 104 has an inner surface 112 and an outer surface 116. The plate 104 also has a recess 106 that extends from the inner surface 112 toward the outer surface 116. The plate 104 also includes an opening 124 that receives a control rod and stem screw has shown in FIG. 4.

The inner surface 112 is adapted to receive a backflow preventer 120. The backflow preventer 120 is positioned within the recess 106 such that an outer edge of the backflow preventer 120 does not extend from the inner surface 112 to an extent that adversely affects door closure.

Figure 9:
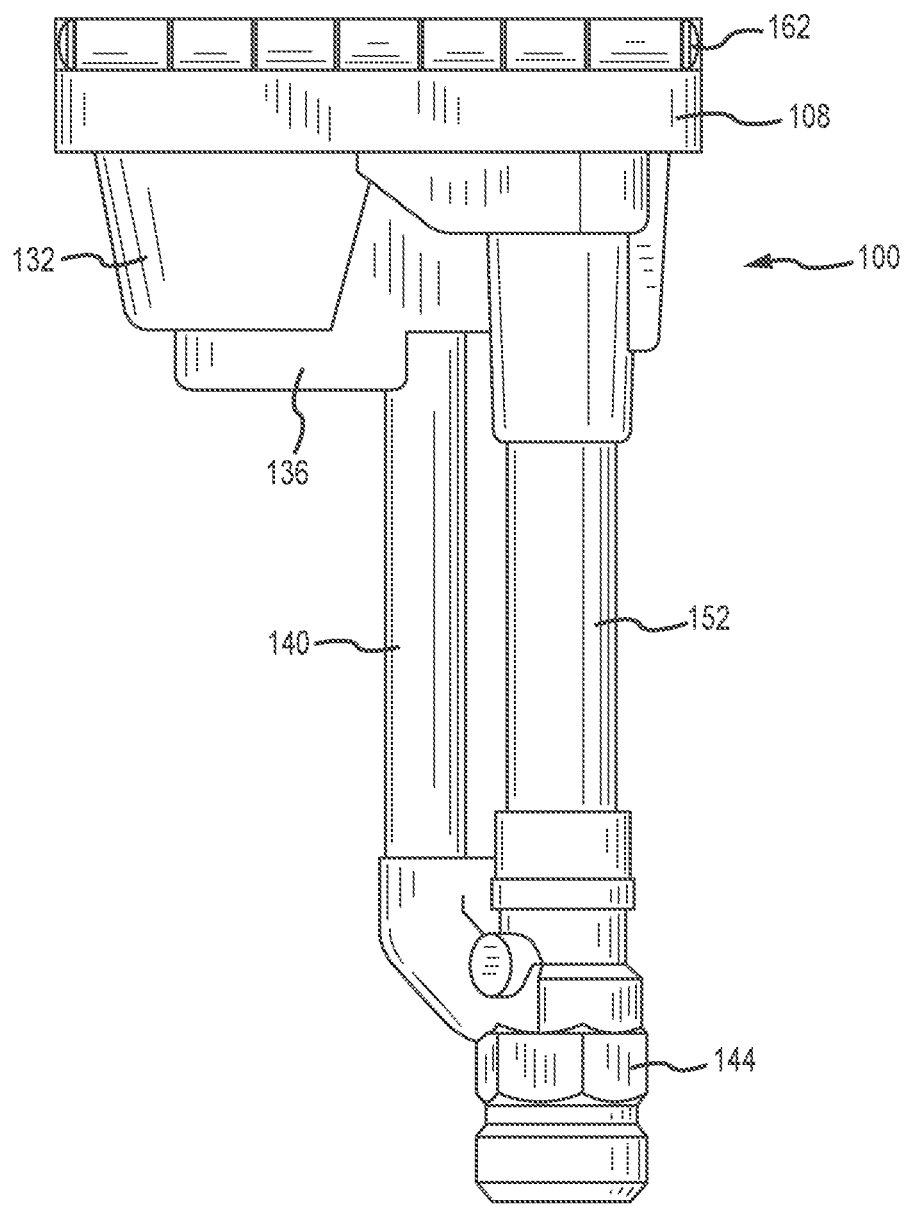
FIG. 9 is a bottom elevation view of FIG. 8.
Figure 10:
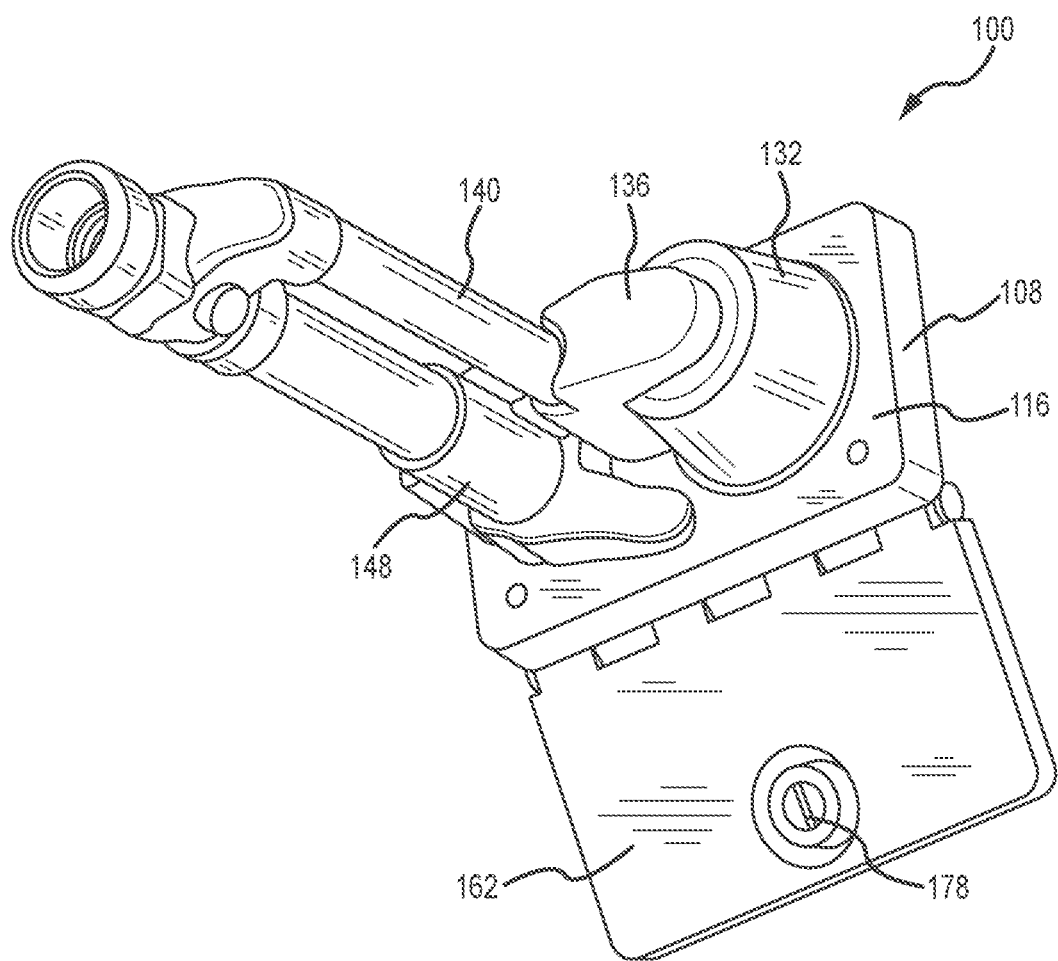
FIG. 10 is a rear perspective view of FIG. 7.
Figure 11:
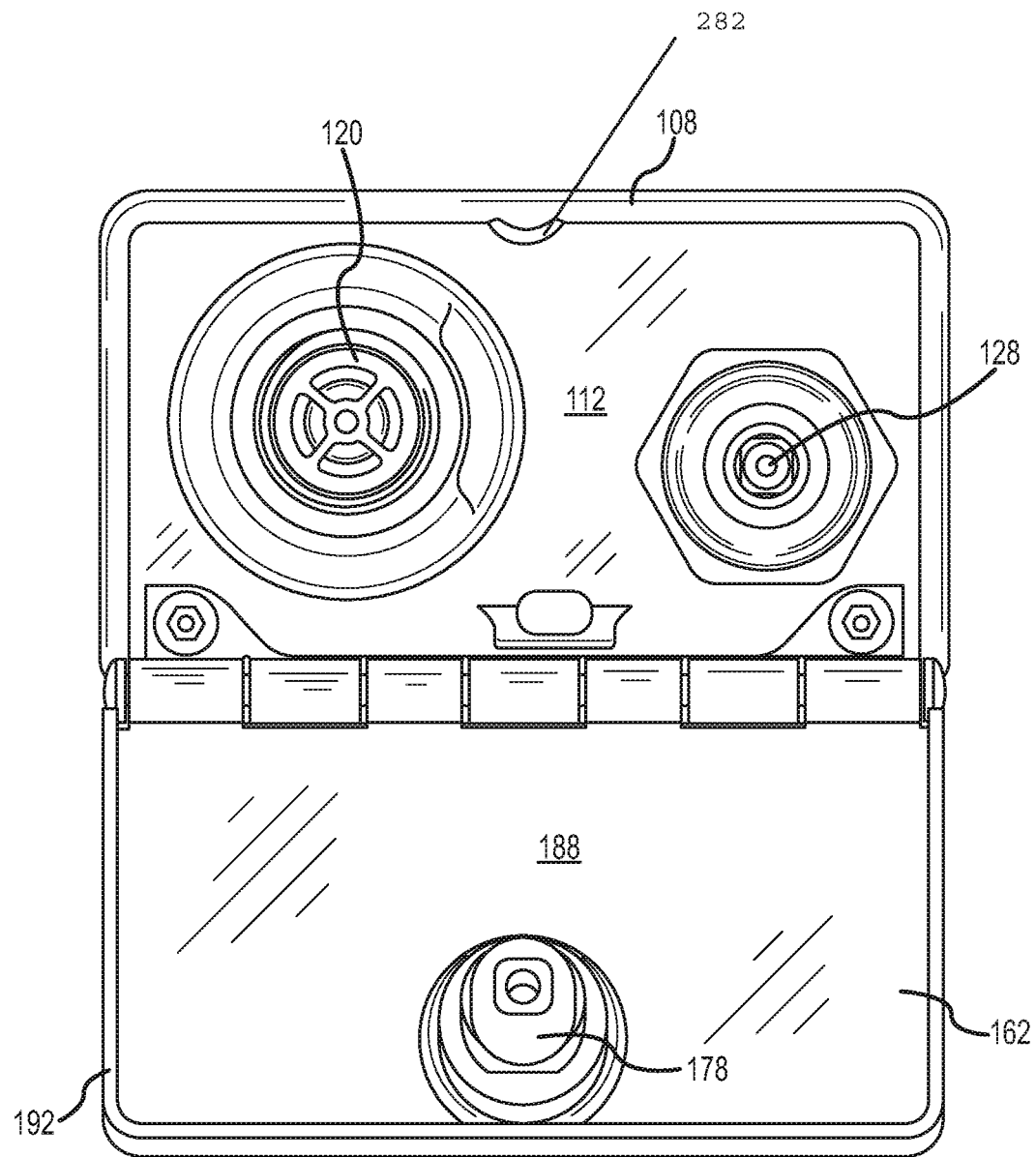
FIG. 11 is a front elevation view of FIG. 7.
Figure 12:
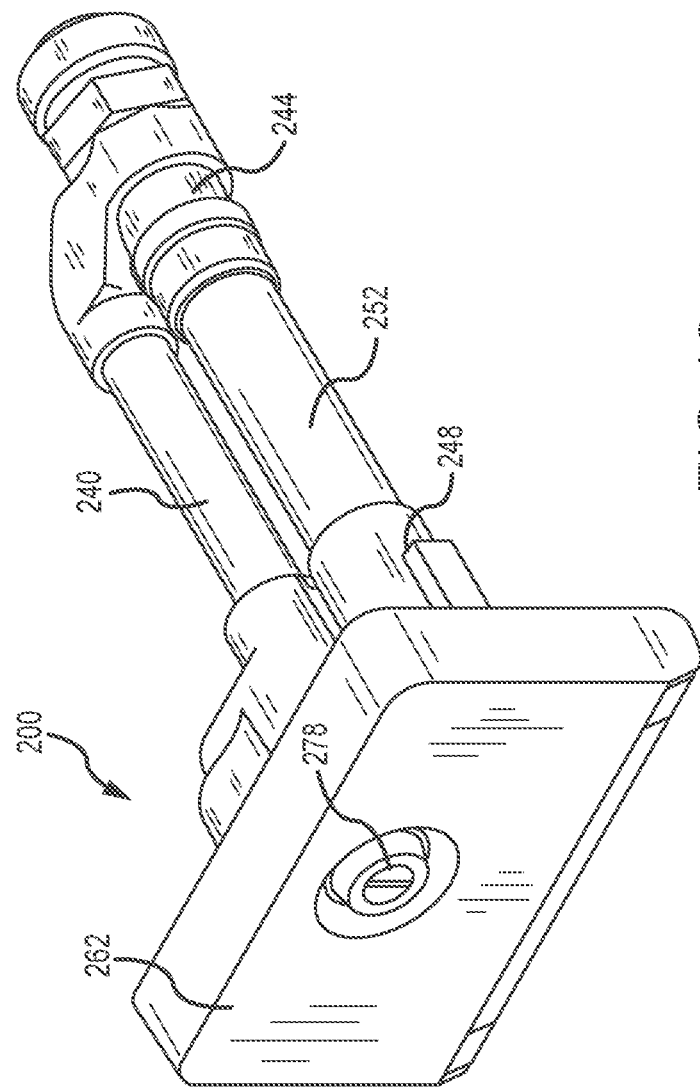
FIG. 12 is a front perspective view of an enclosure with an integrated hydrant of another embodiment of the present invention.

FIGS. 9 and 10 show a rear portion of the enclosure 100. The recess in the plate forms an outwardly-extending protrusion 132, which in one embodiment is frusto-conical. The protrusion 132 has an outer surface that includes an opening (not shown) that communicates with a conduit 136 that connects fluid supply tube 140 to the backflow preventer. Those of skill the art will appreciate that the fluid supply tube 140 may be directly interconnected to the protrusion 132, but such configuration may not be ideal as the size of the valve 144, or length of the fluid supply tube 140 would have to be increased or lengthened, which will increase material costs. The outer surface 116 of the plate also includes a boss 148 that supports the control tube 152.

In operation, the user turns a key interconnected to the stem screw 128, which removes the plunger from the valve 144 and allows fluid to escape through the fluid supply tube 140. One of skill in the art will appreciate that other mechanisms to control fluid flow besides a plunger may be use without departing from the scope of the invention. Fluid exits the hydrant by a backflow preventer 120. Turning the key in the opposite direction places the plunger into engagement with the valve 144 to cease fluid flow through the fluid supply tube 140. After the hydrant is shut off, fluid may remain in the fluid supply tube 140 and the control tube 152. Thus, in one embodiment, the fluid supply tube 140 and the control tube 152 are angled relative to the outer surface 116 of the hydrant so fluid will leak from the hydrant after the valve closes.

One embodiment of the present invention includes a door 162 as shown in FIGS. 7-11. The door 162 is hingedly interconnected to a hinge plate 166 interconnected to the lip 108. In some embodiments the hinge plate is interconnected to the plate inner surface 112. Here, the hinge plate 166 includes a plurality of protrusions 170 that receive fasteners 174 that engage the inner surface 112. The fasteners are alternatively interconnected to the lips. The door 162 may also include a lock 178 that selectively engages a protrusion 182 extending from the inner surface 112. If the door becomes damaged or the user changes the look of the door 162, the door 162 can be opened to expose the fasteners 174. The fasteners are then removed and a new door is interconnected to the plate 104.

The internal volume of the enclosure 100 may be increased to accommodate one or two fluid flow supply tubes and associated backflow preventers. More specifically, some hydrants include hot and cold water delivery means and it is within the skill of those of skill in the art to expand the size of the enclosure to accommodate the same.

Figure 4:
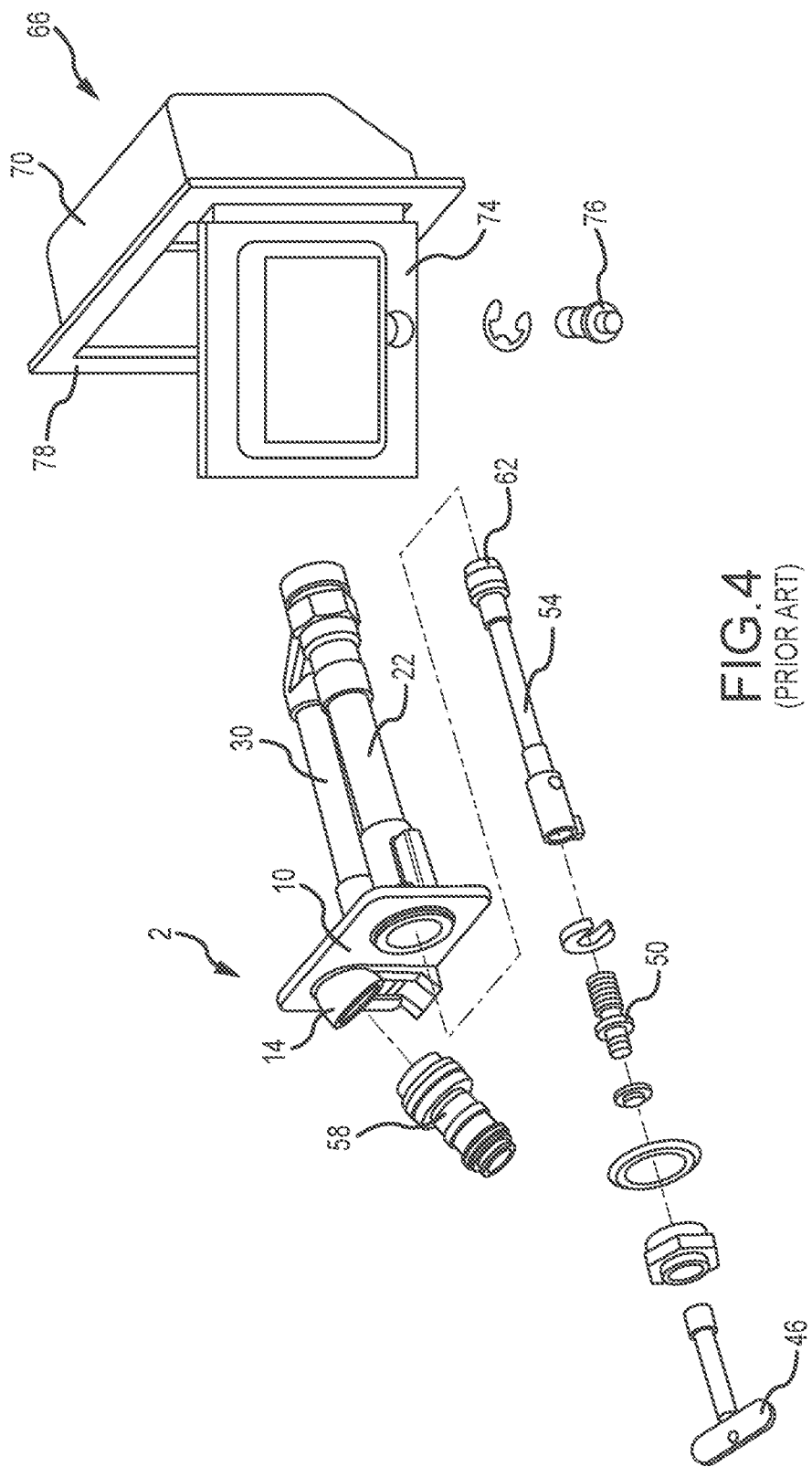
FIG. 4 is an exploded perspective view showing a hydrant and a prior art enclosure.
Figure 5:
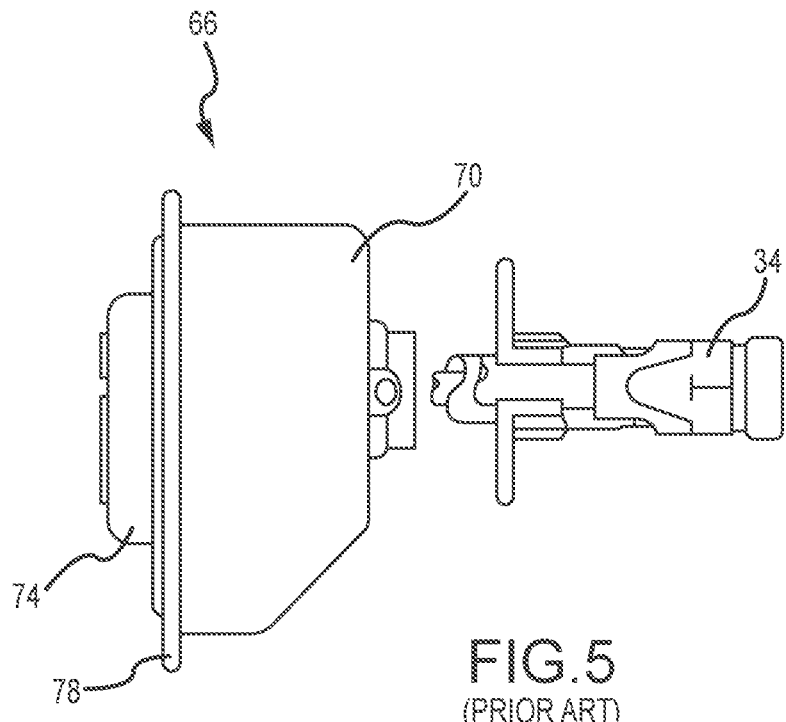
FIG. 5 is a side elevation view of a hydrant positioned within a prior art enclosure.
Figure 6:
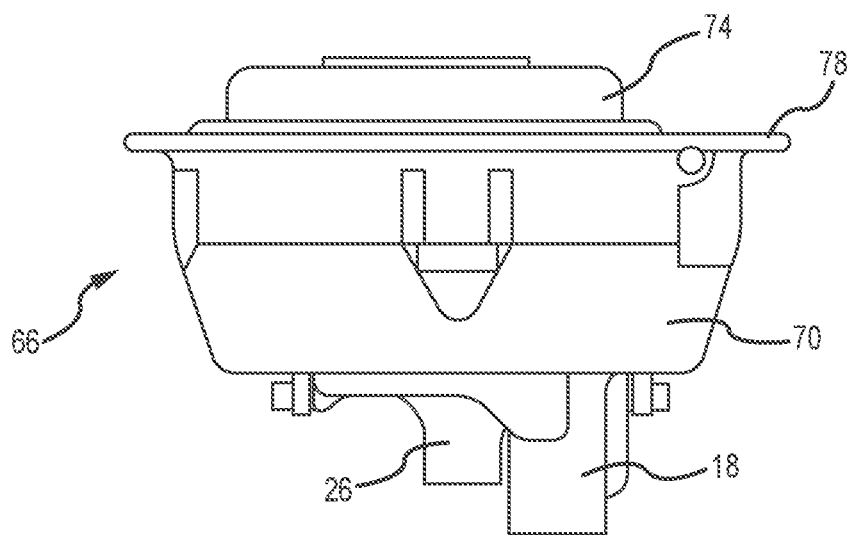
FIG. 6 is a top elevation view of FIG. 5.
Figure 7:
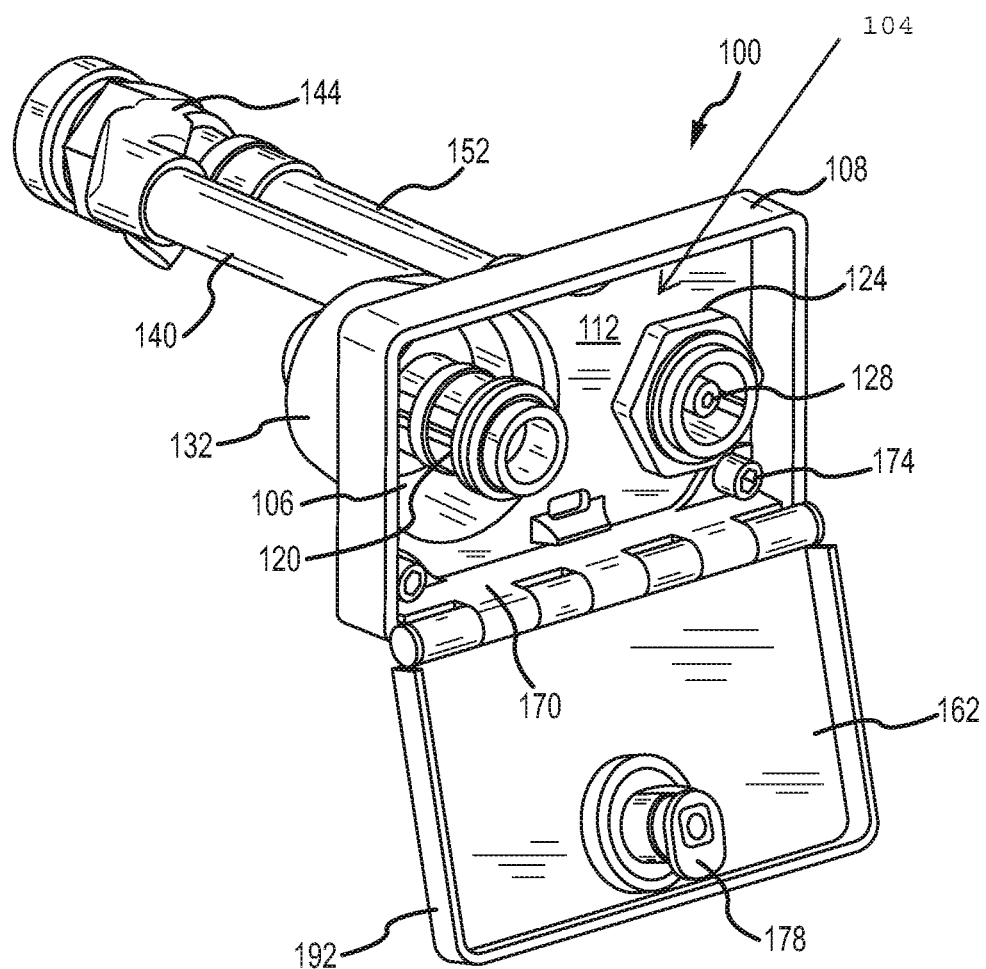
FIG. 7 is a perspective view of an enclosure of one embodiment of the present invention wherein a door is open.
Figure 8:
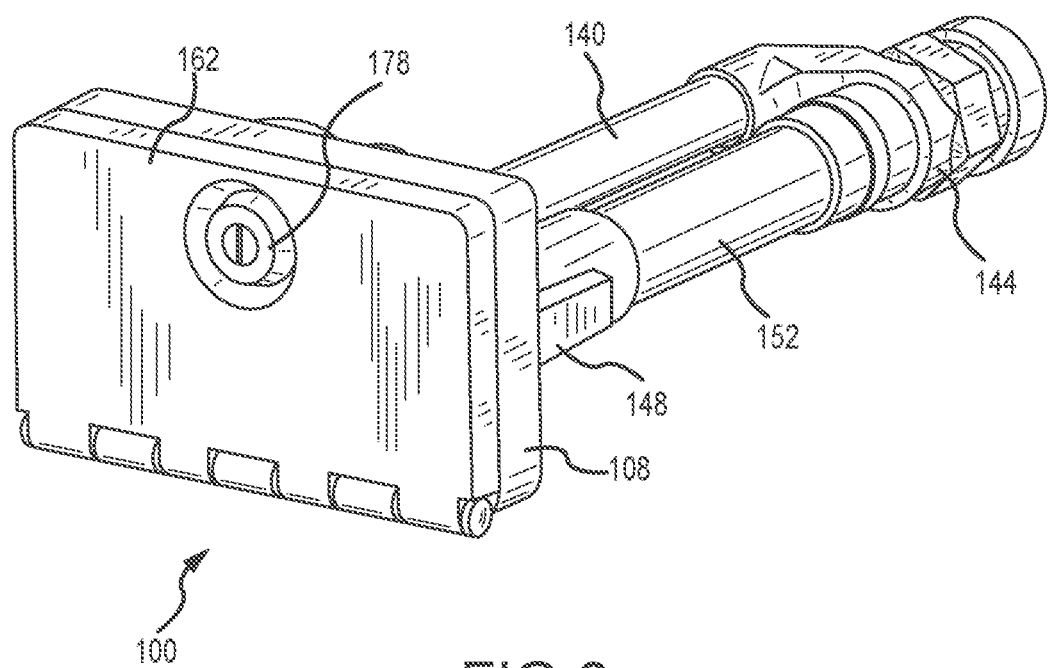
FIG. 8 is a perspective view similar to that of FIG. 7 wherein the door is closed.

FIGS. 12-19 show an enclosure 200 having integrated hydrant of another embodiment of the present invention. The enclosure 200 is defined by a plate 204 with an inner surface 212 and an outer surface 216. The plate 204 has a recess 206 that extends from the inner surface 212 toward the outer surface 216. The plate 204 also includes an opening 224 that receives a control rod and stem screw 228 as shown in FIG. 4.

The inner surface 212 is adapted to receive a backflow preventer 220. The backflow preventer 220 is positioned within the recess 206 such that an outer edge of the backflow preventer 220 does not extend from the inner surface 212 to an extent that adversely affects door closure.

Figure 13:
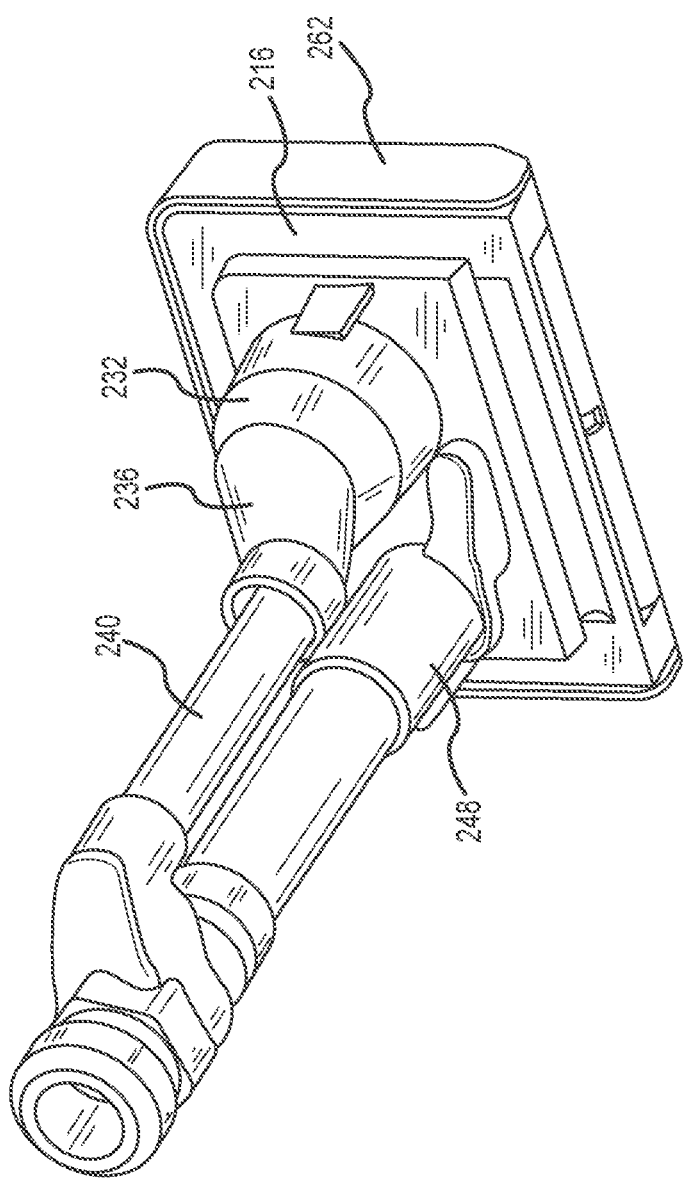
FIG. 13 is a rear perspective view of the enclosure shown in FIG. 12.
Figure 14:
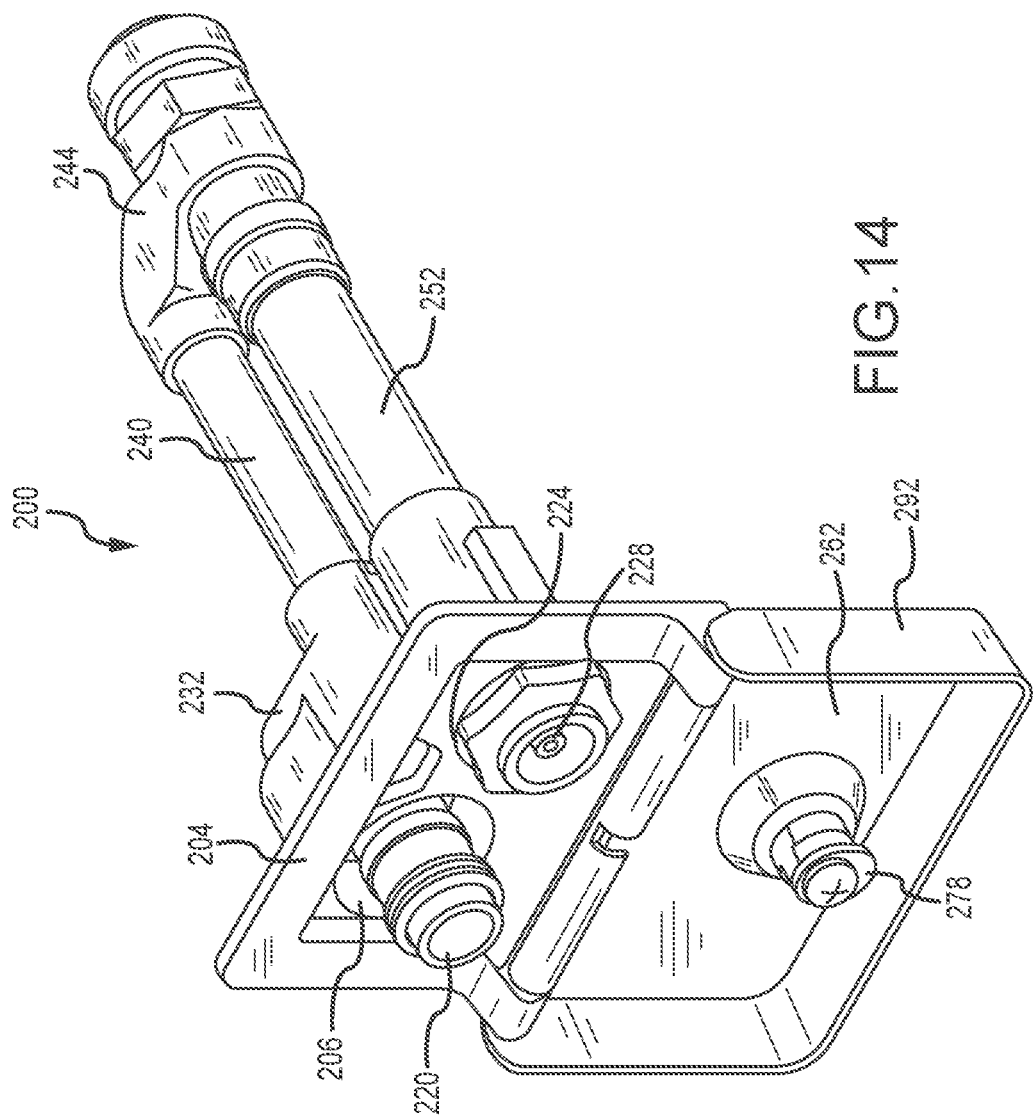
FIG. 14 is a front perspective view of the enclosure shown in FIG. 12 with a door open.
Figure 15:
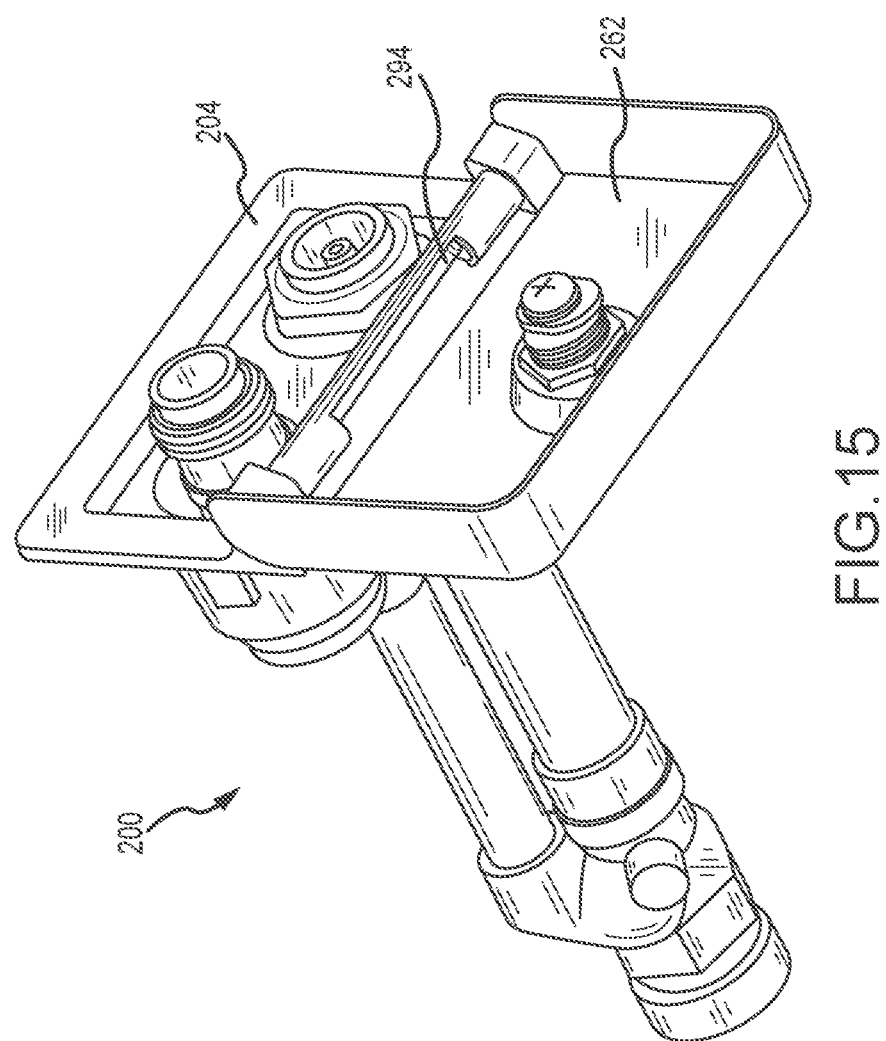
FIG. 15 is another front perspective view of the enclosure shown in FIG. 12 with the door open.
Figure 16:
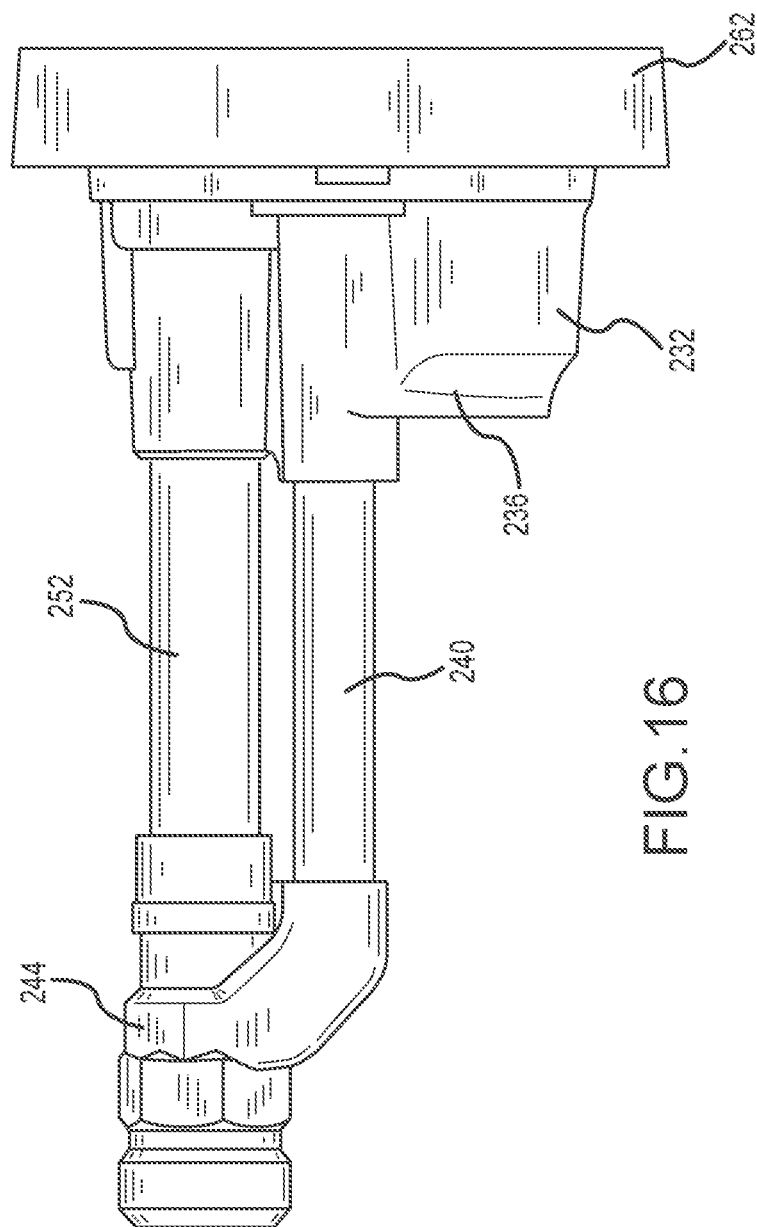
FIG. 16 is a top plan view of the enclosure shown in FIG. 12.
Figure 17:
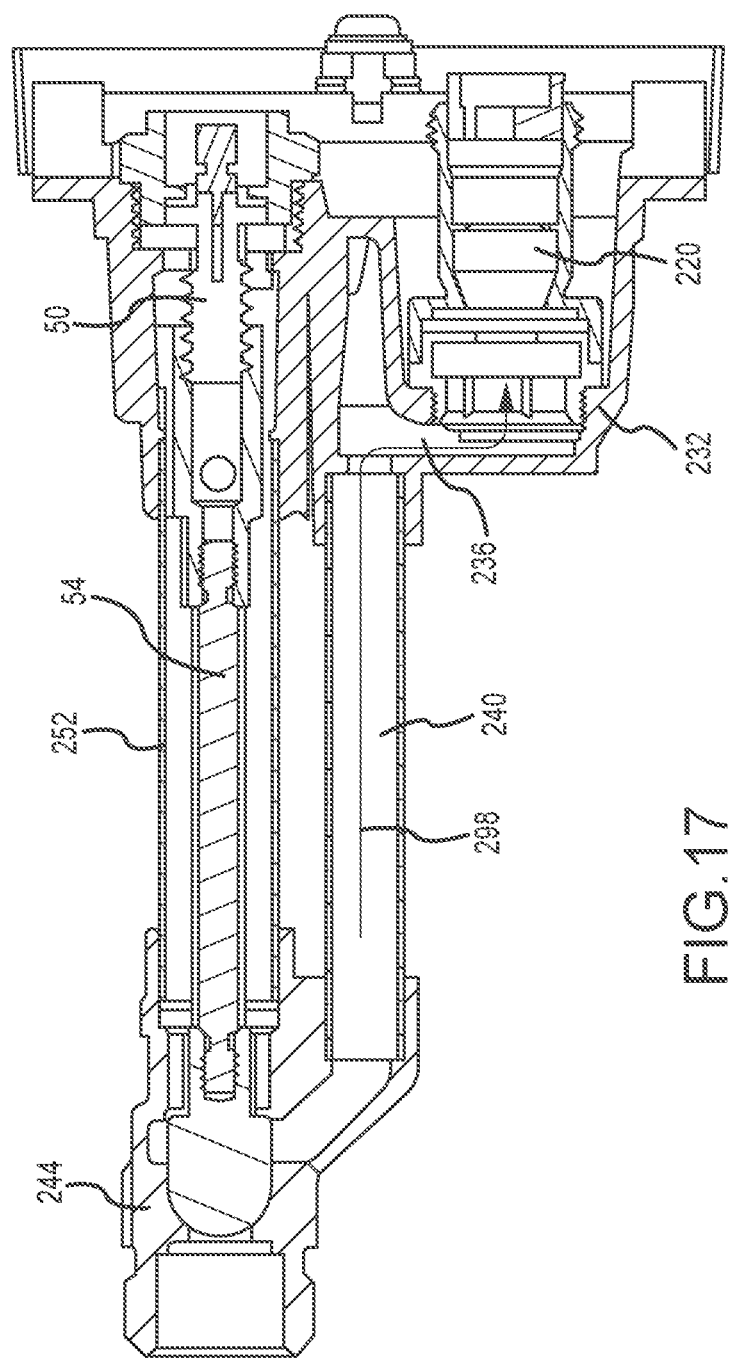
FIG. 17 is a cross sectional view of FIG. 16.
Figure 18:
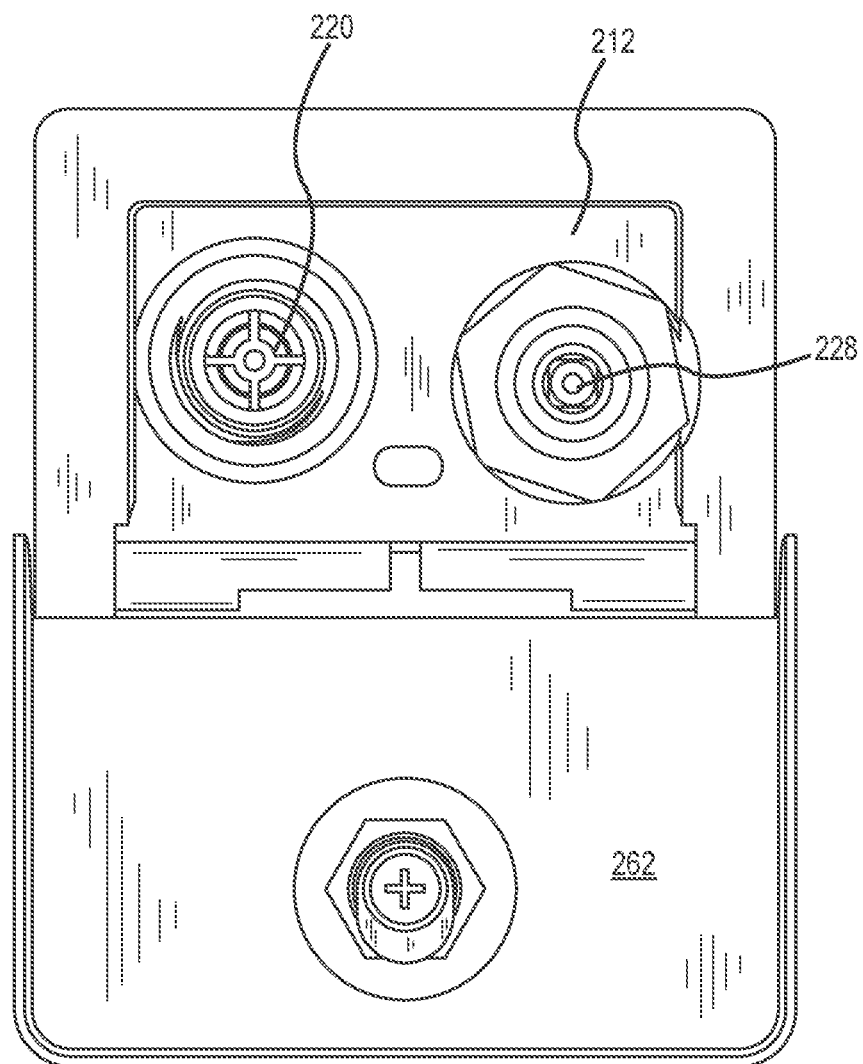
FIG. 18 is a front elevation view of the enclosure shown in FIG. 12.
Figure 19:
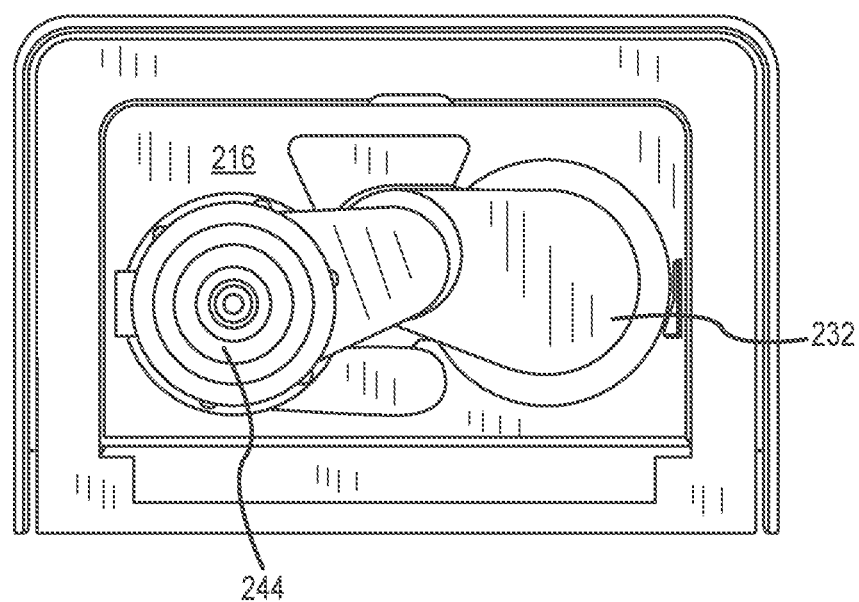
FIG. 19 is a rear elevation view of the enclosure shown in FIG. 12.
Figure 20:
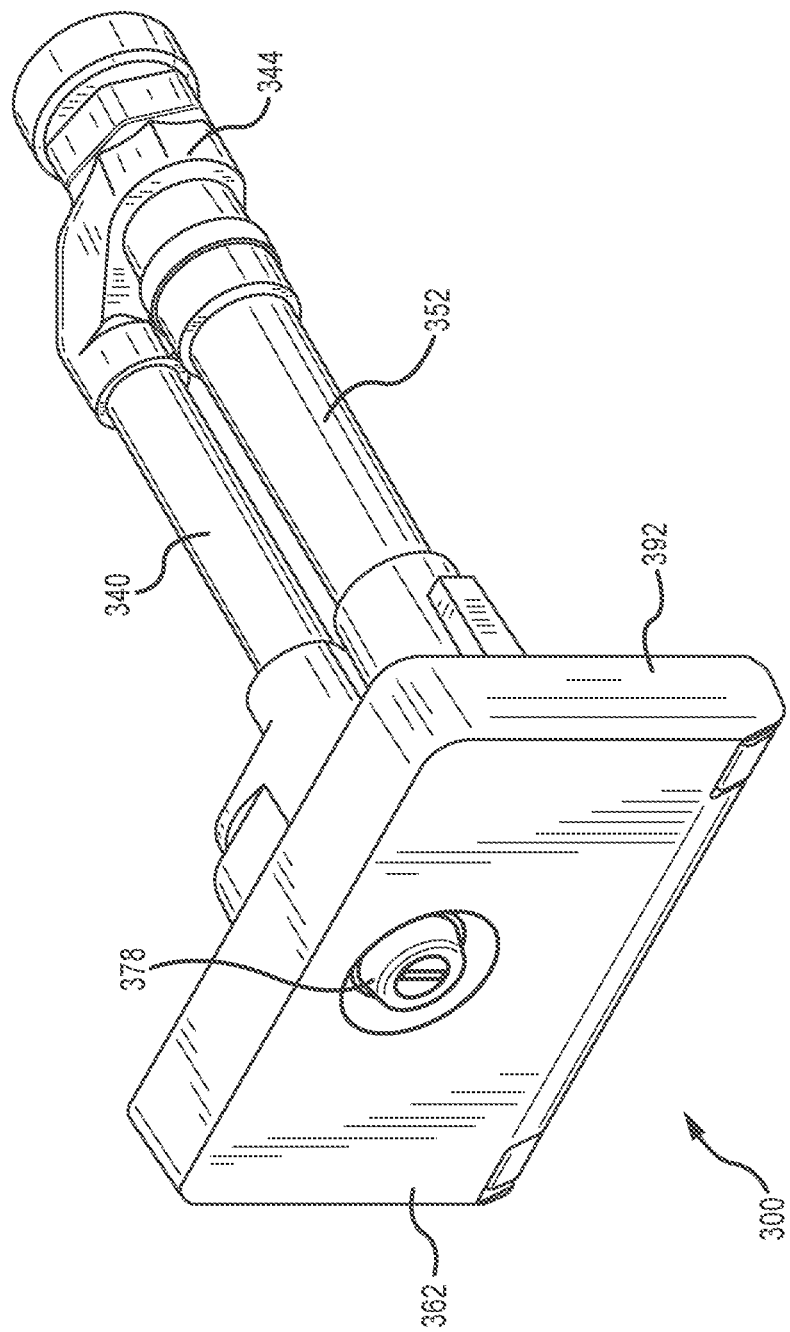
FIG. 20 is a front perspective view of an enclosure with an integrated hydrant of another embodiment of the present invention.
Figure 21:
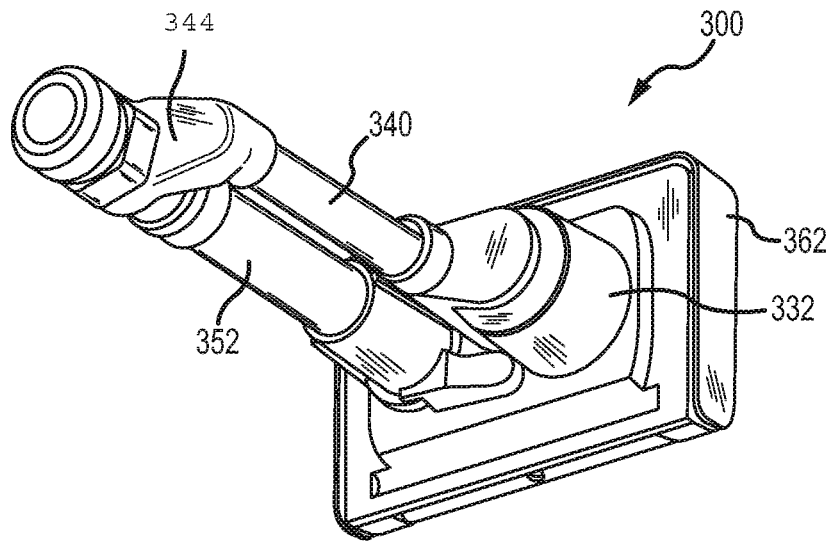
FIG. 21 is a rear perspective view of the enclosure shown in FIG. 20.
Figure 22:
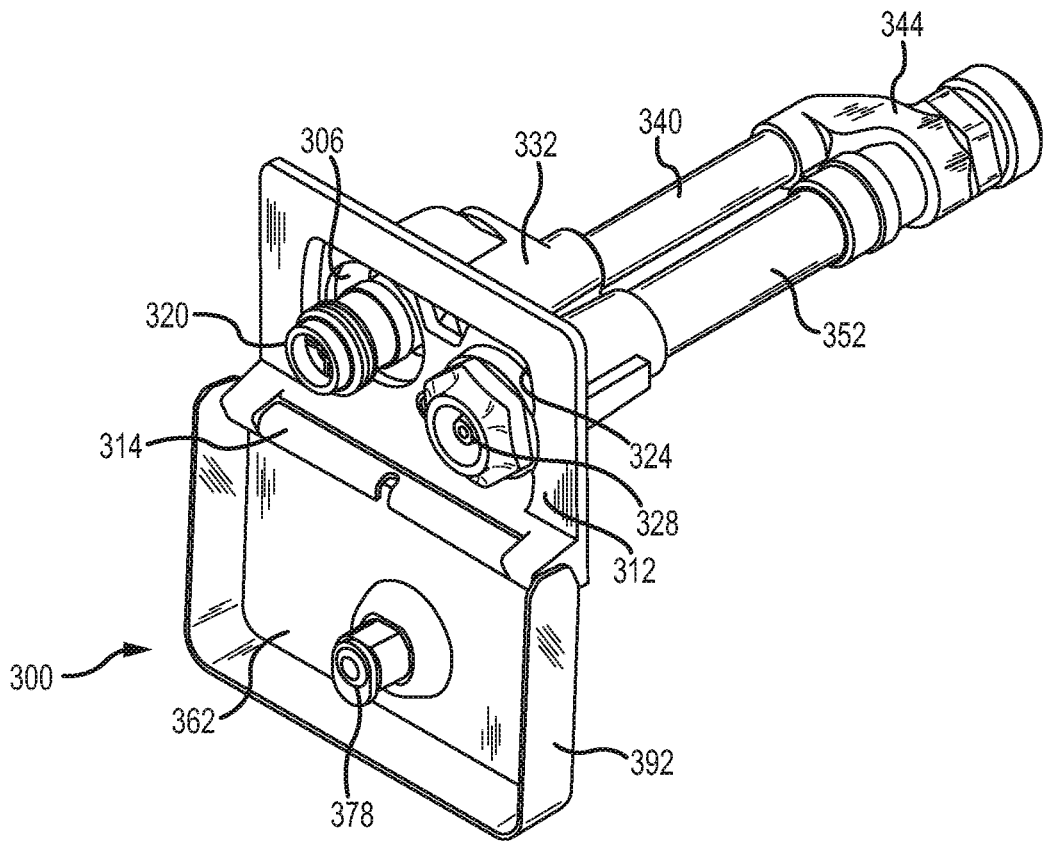
FIG. 22 is a front perspective view of the enclosure shown in FIG. 20 with a door open.
Figure 23:
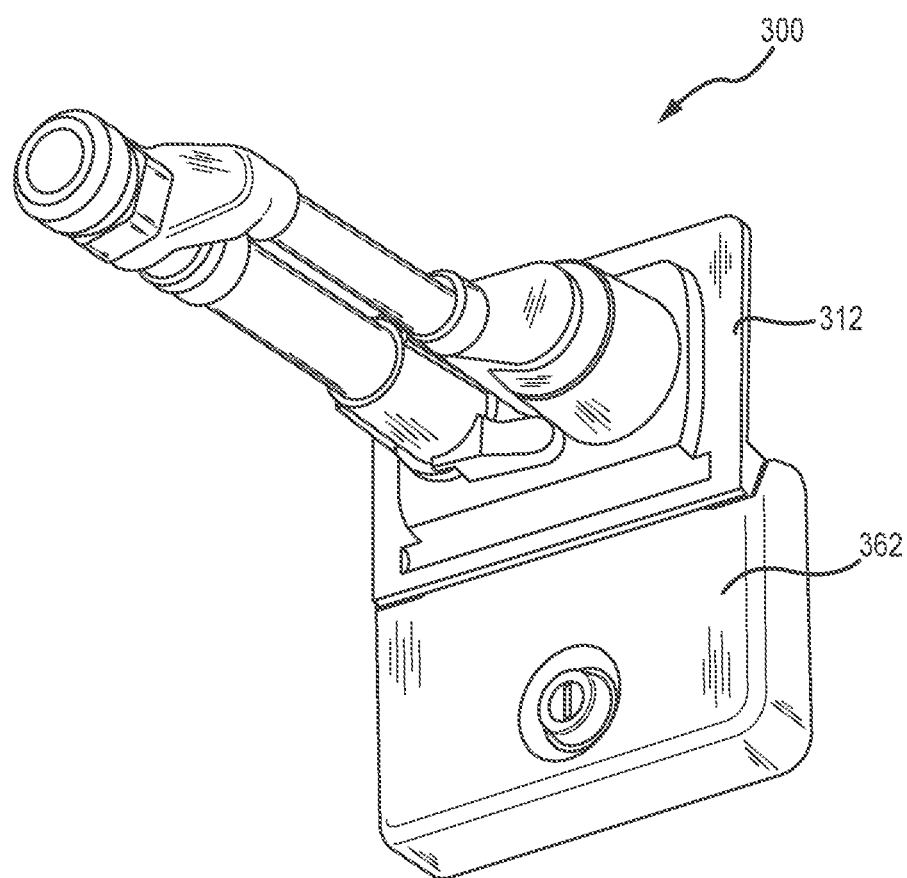
FIG. 23 is a rear perspective view of the enclosure shown in FIG. 20 with the door open.
Figure 24:
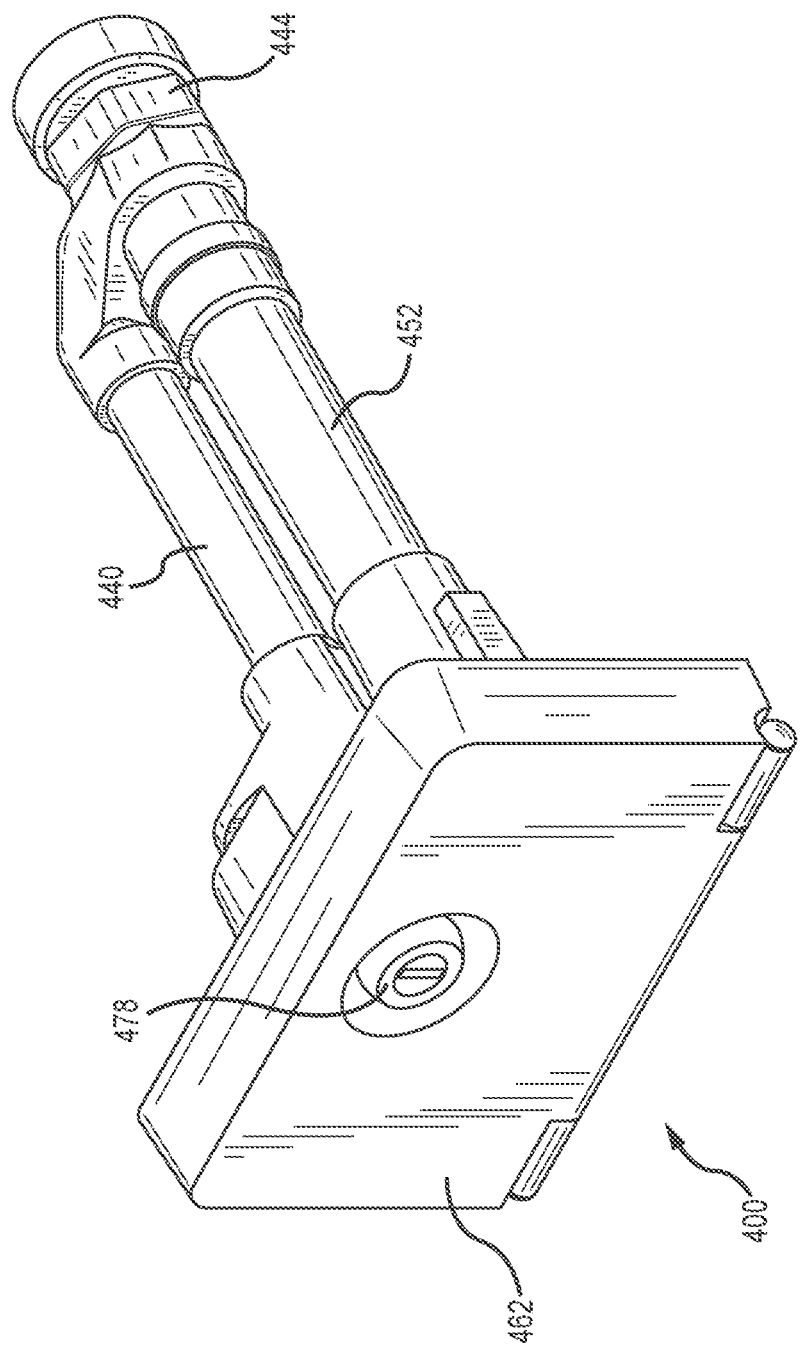
FIG. 24 is a front perspective view of an enclosure with an integrated hydrant of another embodiment of the present invention.
Figure 25:
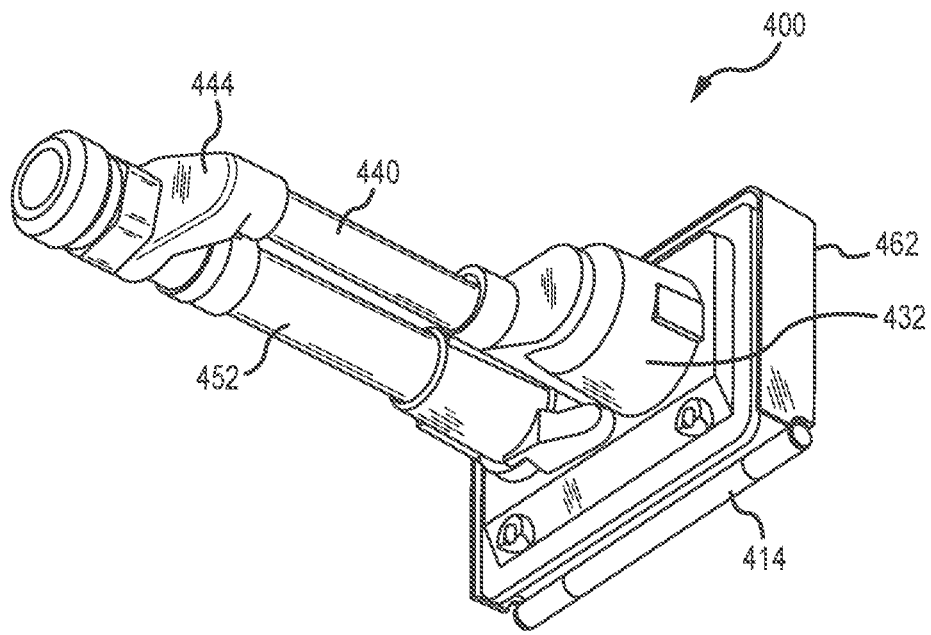
FIG. 25 is a rear perspective view of the enclosure shown in FIG. 24.
Figure 26:
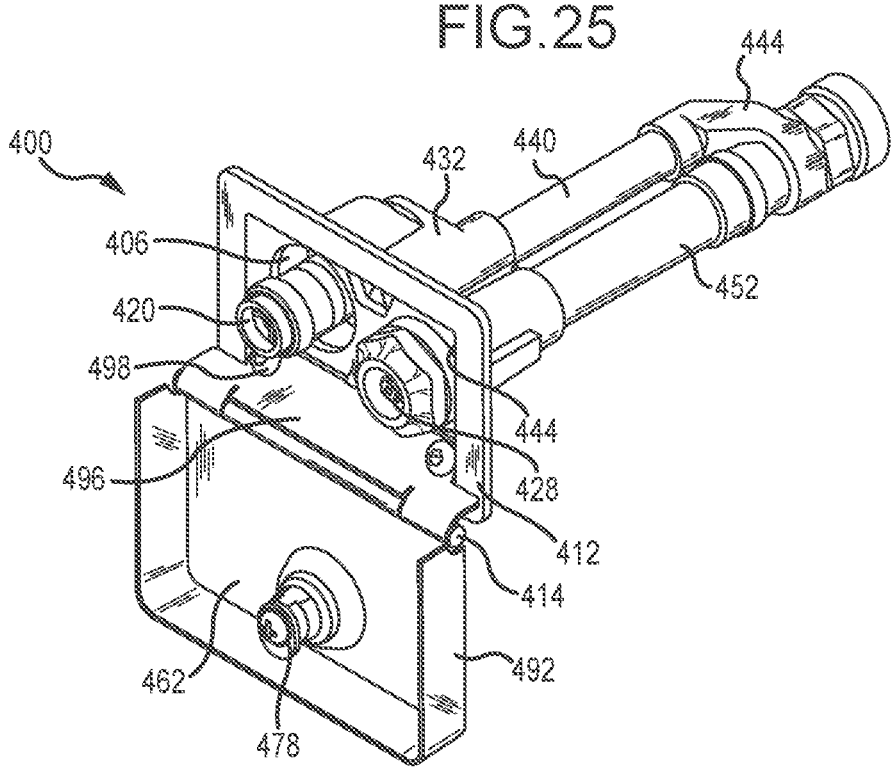
FIG. 26 is a front perspective view of the enclosure shown in FIG. 24 with the door open.
Figure 27:
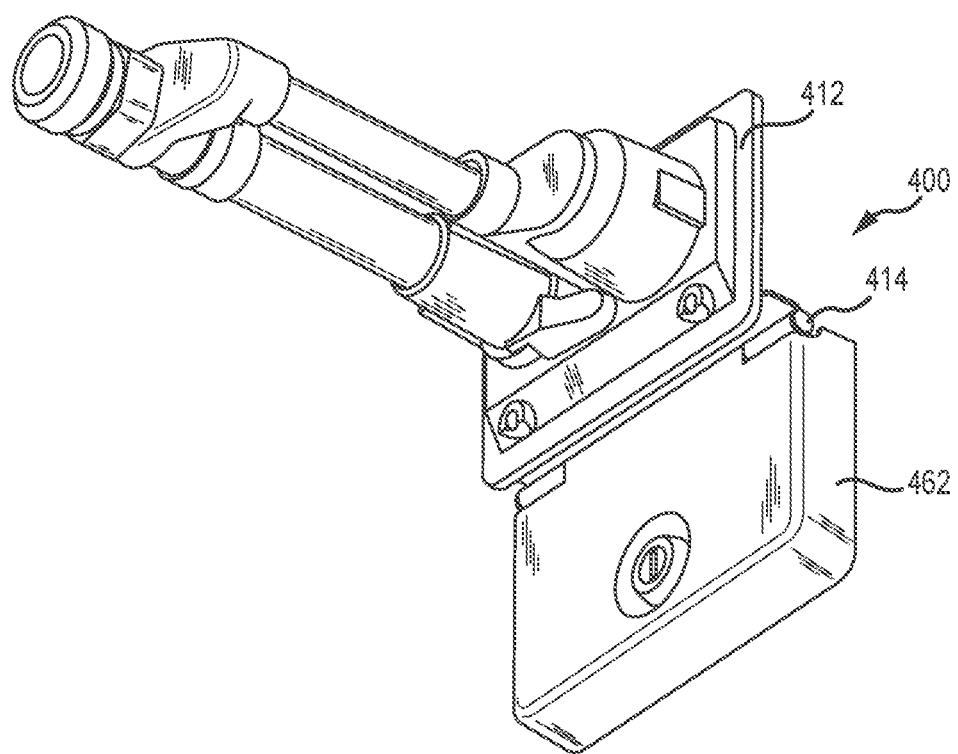
FIG. 27 is a rear perspective view of the enclosure shown in FIG. 24 with the door open.
Figure 28:
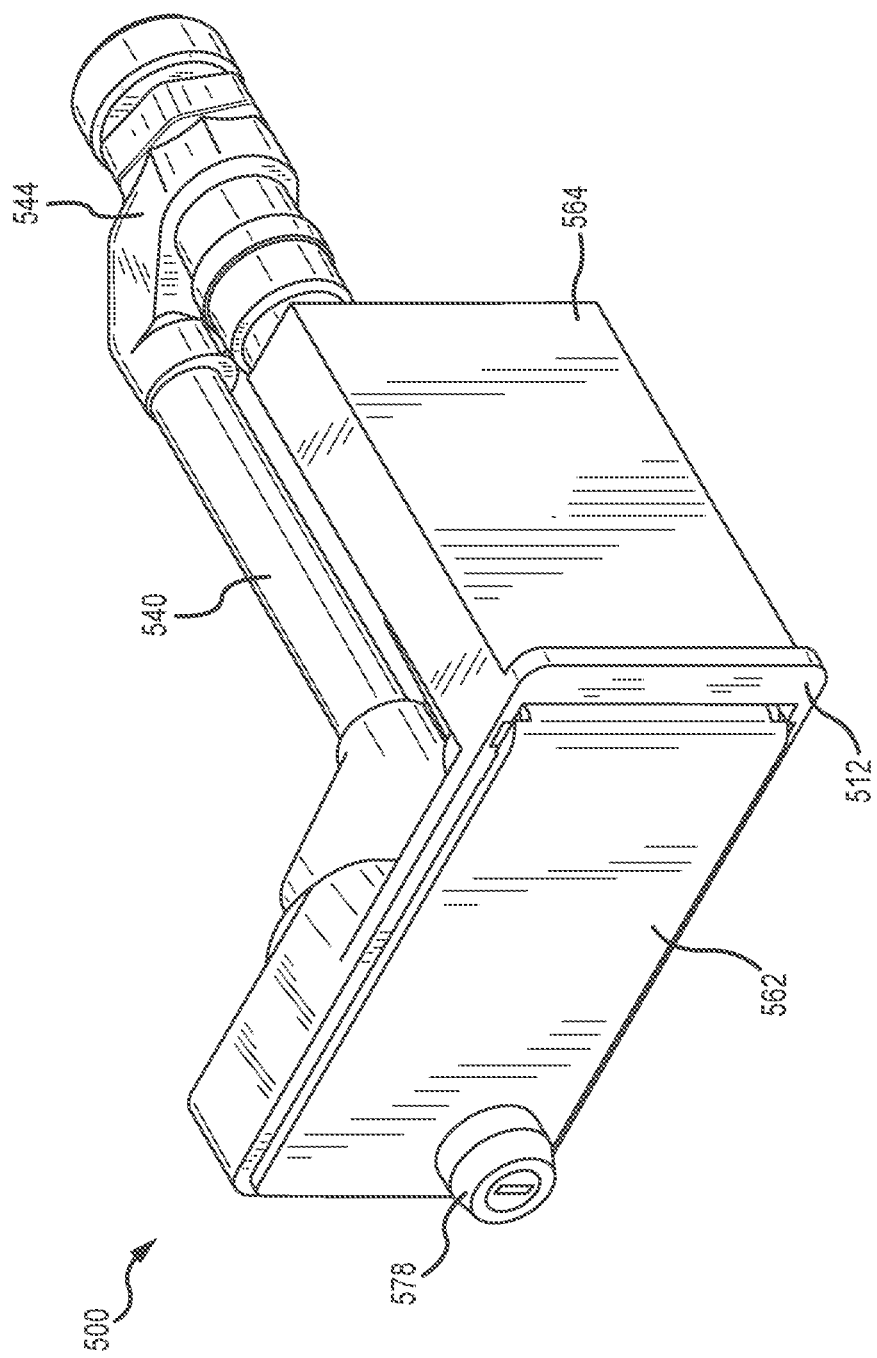
FIG. 28 is a front perspective view of an enclosure with an integrated hydrant of another embodiment of the present invention.
Figure 29:
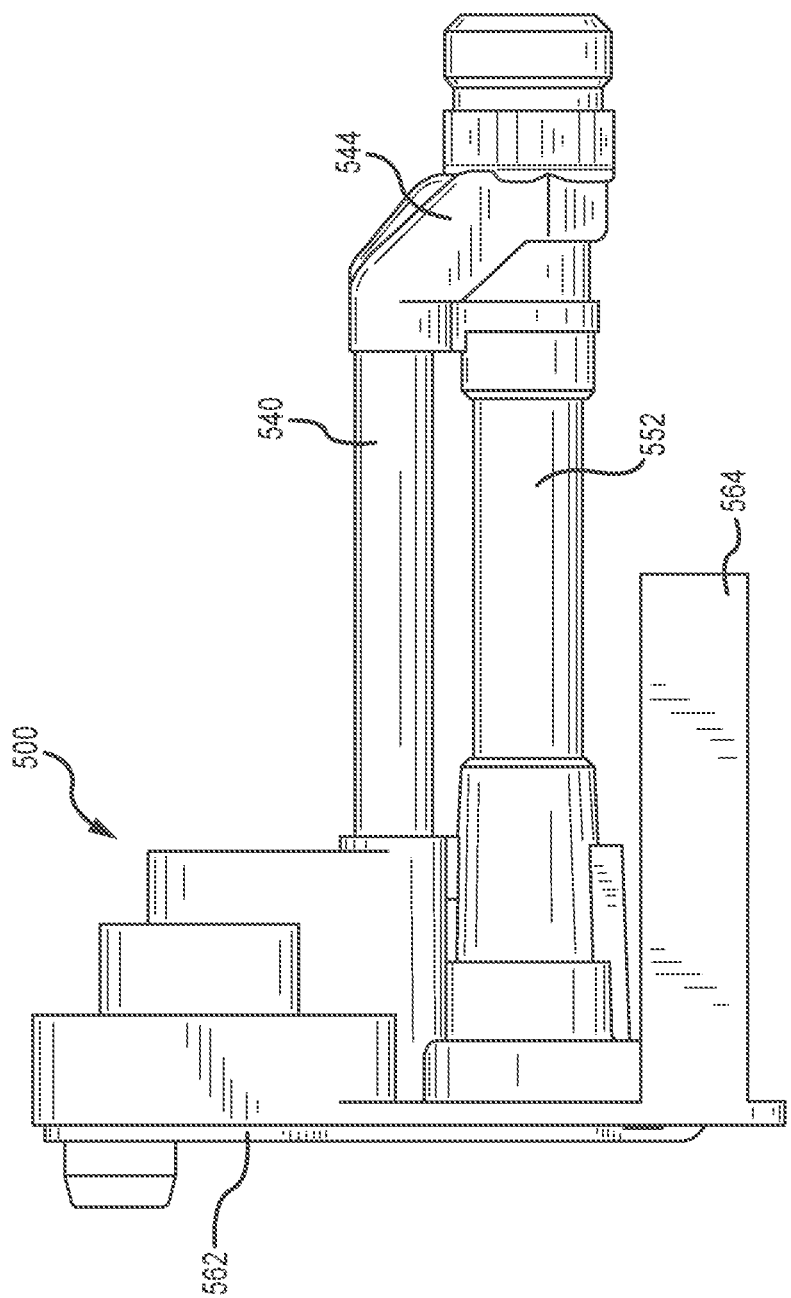
FIG. 29 is a top elevation view of the enclosure shown in FIG. 28.
Figure 30:
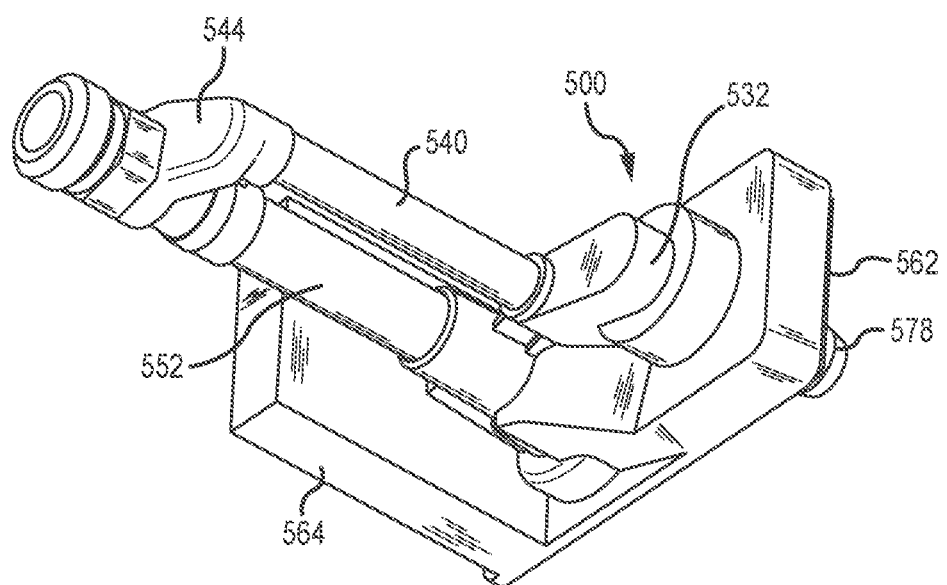
FIG. 30 is a rear perspective view of the enclosure shown in FIG. 28.
Figure 31:
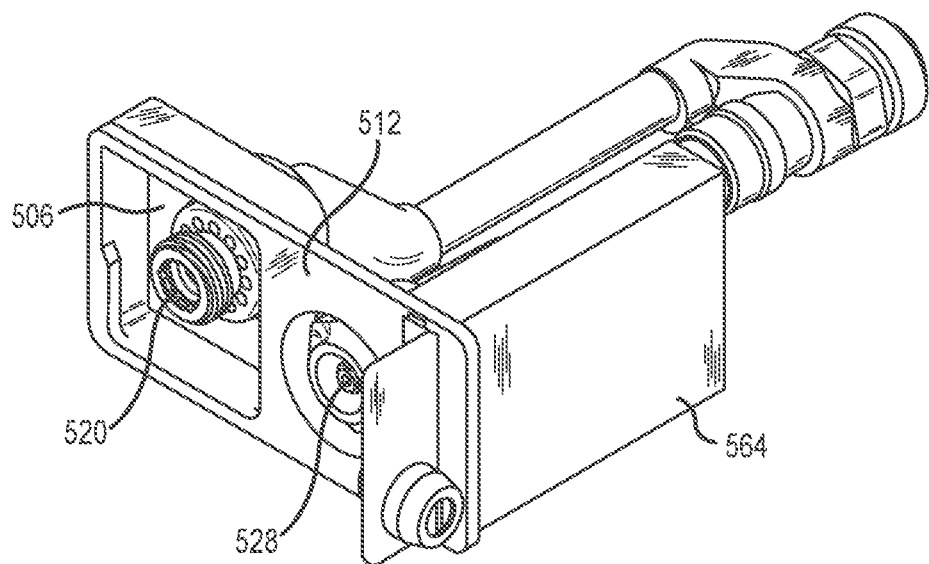
FIG. 31 is a front perspective view of the enclosure shown in FIG. 28 with the door open.
Figure 32:
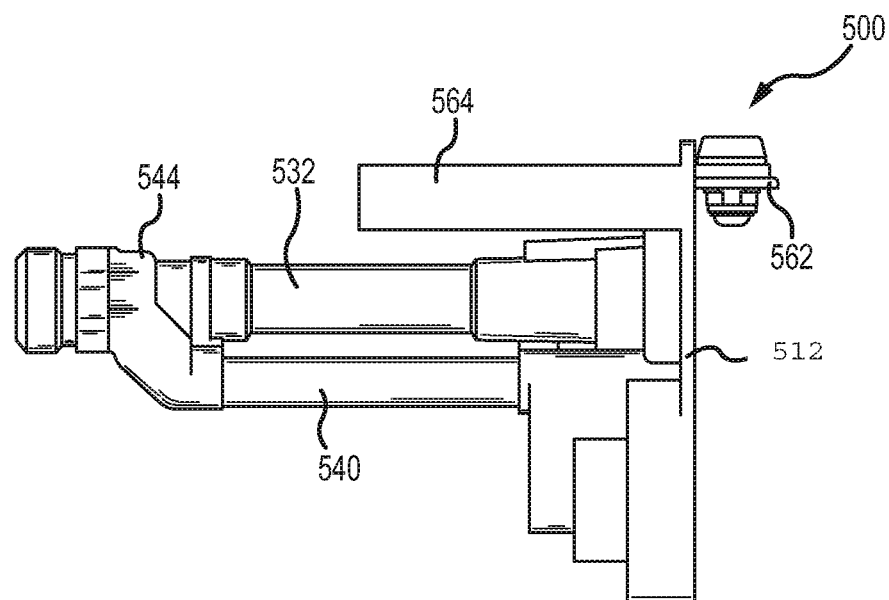
FIG. 32 is a top plan view of the enclosure shown in FIG. 28 with the door open.
Figure 33:
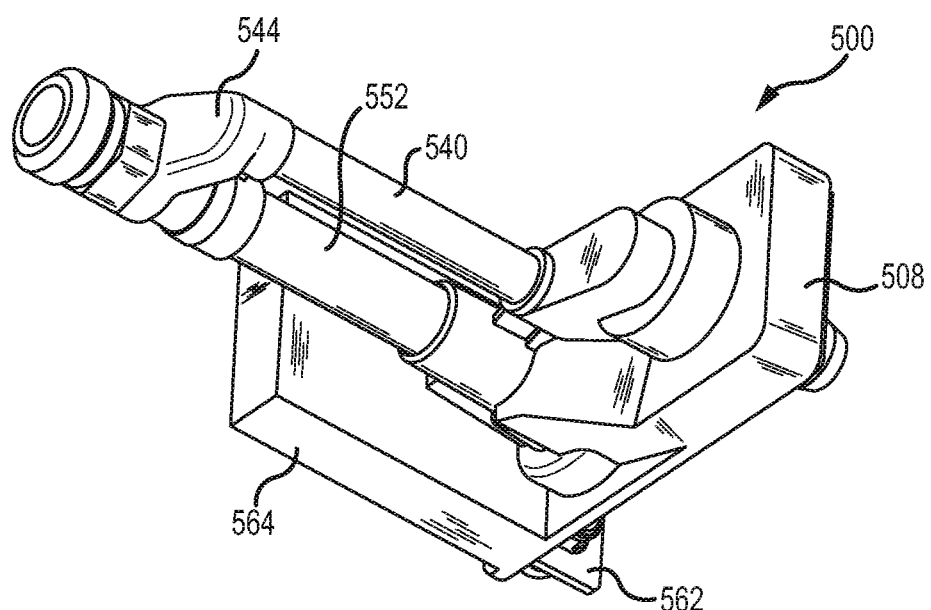
FIG. 33 is a rear perspective view of the enclosure shown in FIG. 28 with the door open.

FIGS. 13, 15, and 19 show a rear portion of the enclosure 200. The recess in the plate forms outwardly-extending protrusion 232, which in one embodiment is frusto-conical. The protrusion 232 has an outer surface that includes an opening (not shown) that communicates with a conduit 236 (see FIG. 17) that connects fluid supply tube 240 to the backflow preventer. Those of skill in the art will appreciate that the fluid supply tube 240 may be directly interconnected to the protrusion 232, but such configuration may not be ideal as the size of the valve 244, or length of the fluid supply tube 240 would have to be increased or lengthened, which will increase material costs. The outer surface 216 of the plate also includes a boss 248 that supports the control tube 252.

In operation, the user interconnects the key to the stem screw 228 and turns the same, which removes the plunger from the valve 244 and allows fluid to escape through the fluid supply tube 240. Fluid travels through the conduit 236 along fluid flow path 298 and exits the backflow preventer 220. Turning the key in the opposite direction places the plunger back into engagement with the valve 244 to cease fluid flow through the fluid supply tube 240. After the hydrant is shut off, fluid is left in the fluid supply tube 240 and the control tube 252.

The door 262 of this embodiment includes a lip 292 and is hingedly interconnected to the plate 204. As shown in FIG. 15, the door 262 may be interconnected to the plate 204 by removable pins 294. The door 262 may also include a lock 278 that selectively engages a protrusion 282 extending from the inner surface 212.

FIG. 20-23 show another embodiment of the present invention. Here, the enclosure 300 includes a door 362 having a peripheral lip 392. The door also includes a lock 378. The remaining structure of the hydrant and enclosure are, or may be, similar to that described above regarding FIGS. 7-19. A door 362 is interconnected to a plate (also sometimes known as a "face plate") 312 by a hinge 314. The protrusion 332 extends from the plate 312 associated with a fluid supply tube 340 also interconnected to a valve 344. The valve 344 is also interconnected to a control tube 352 associated with the plate 312. The protrusion 332 defines a recess 306 for receipt of a backflow preventer 320.

The plate also includes an opening 324 associated with a stem screw 328 operatively interconnected to a plunger that opens and closes the valve 344. The door 362 may include a lock 378 that selectively interfaces with the plate 312, or a protrusion extending therefrom. One of skill in the art will appreciate that the plate 312 may be associated with a building wherein a rear surface of the plate coincides with the building's outer surface. Alternatively, the hydrant may be affixed to a building wherein the door, when closed, generally coincides with the external building surface; e.g., siding, brick, stone, etc. That is, the plate may be inset relative to the outer surface such that the outer surface of the door 362 would be generally flush with the external surface of the dwelling when the door 362 is closed. In some embodiments of the present invention, the door 362 is textured or otherwise customized to match, or substantially match, the texture and color of the external building service.

FIGS. 24-27 show yet another embodiment of the present invention, which is very similar to that shown in FIGS. 20-23. Here, however, the hinge 414 is of a different configuration. The enclosure 400 includes a door 462 having a lock 478. The door selectively interfaces with a plate 412. The plate 412 includes a recess 406 that accommodates a backflow preventer 420, and an opening 444 associated with a stem screw 428. The plate 412 also includes a protrusion 432 interconnected to a fluid supply tube 440 also interconnected to a valve 444. The valve also receives a control tube 452 as in the embodiments described above. The door 462 may include a lip 492. In this embodiment of the present invention, a hinge plate 496 is provided that is interconnected to the plate 412 by a plurality of fasteners 498.

FIGS. 28-33 show yet another embodiment of the present invention that employs a enclosure 500 with a door 562, which may also include a lock 578. Here, the plate 612 is associated with a pocket 564. In a first configuration the door 562 is closed and an inner surface thereof is abutted against the plate 512, which conceals a backflow preventer 520 and a stem screw 528. The backflow preventer 520 is recessed relative to the front surface of the plate 512 and is situated within a recess 506. The pocket 564 extends rearwardly from the plate 512 towards a valve 544 which, as in the embodiments described above, is interconnected to a fluid supply tube 540 and a control tube 552. In the second configuration, the door 562 is rotated away from the plate 512, which generally aligns the door with an internal volume of the pocket 564. The door 562 is slid into the pocket 564 and at least partially concealed. In this embodiment of the present invention, the enclosure 500 may be attached to a building wherein the front surface of the plate 512 is generally flush with the building's external surface. This contemplated hydrant placement creates an aesthetically pleasing look and prevents the hydrant and interconnected components from being damaged by items moving external to the building, e.g., a vehicle, a cart, etc.

Figure 34:
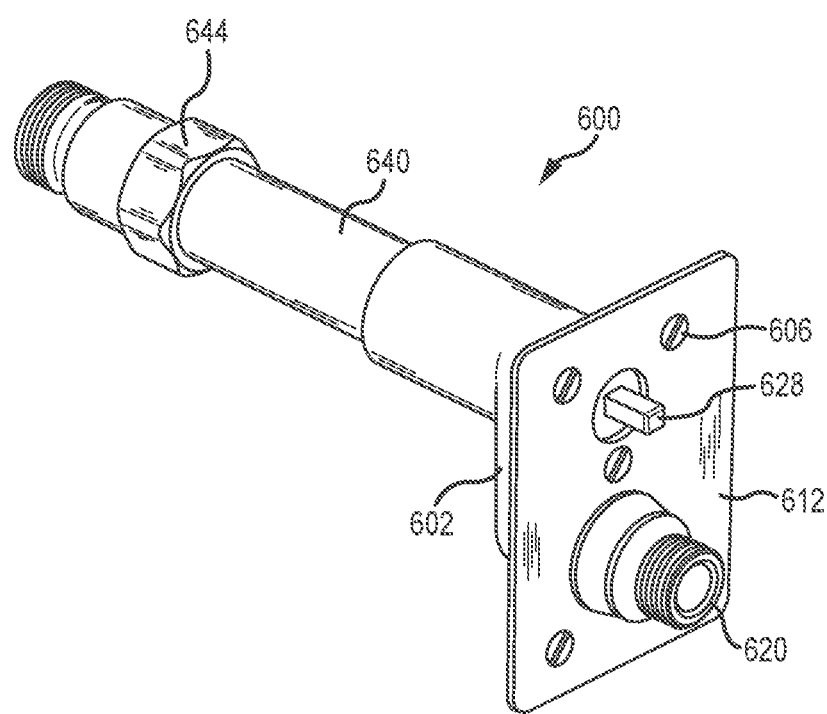
FIG. 34 is a front perspective view of a prior art hydrant.
Figure 35:
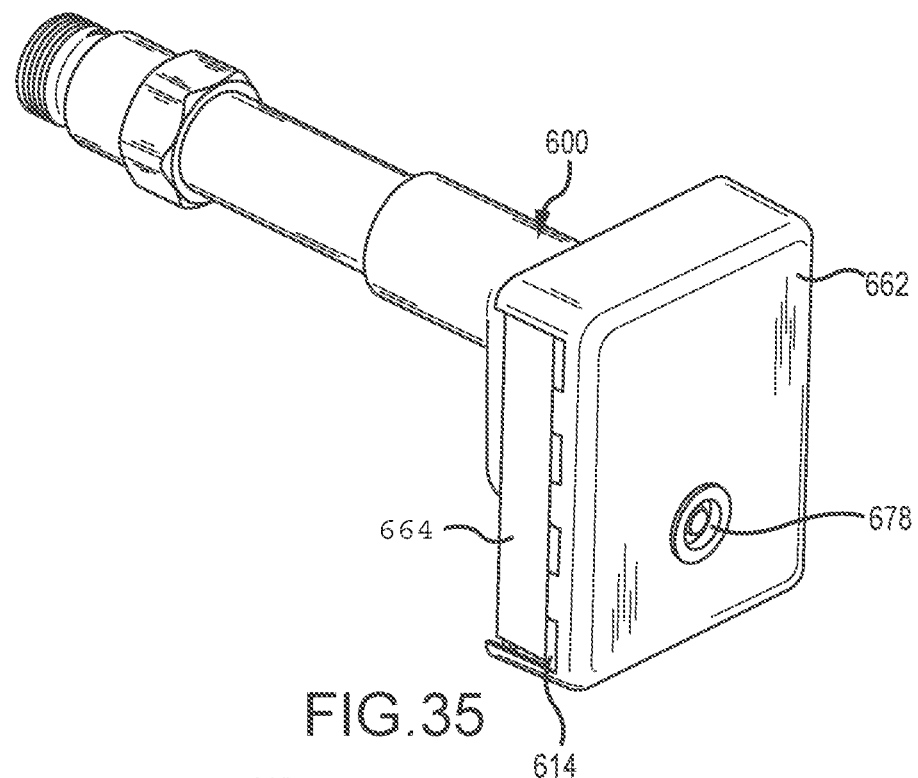
FIG. 35 is a front perspective view of an enclosure of another embodiment integrated to the hydrant of FIG. 34.
Figure 36:
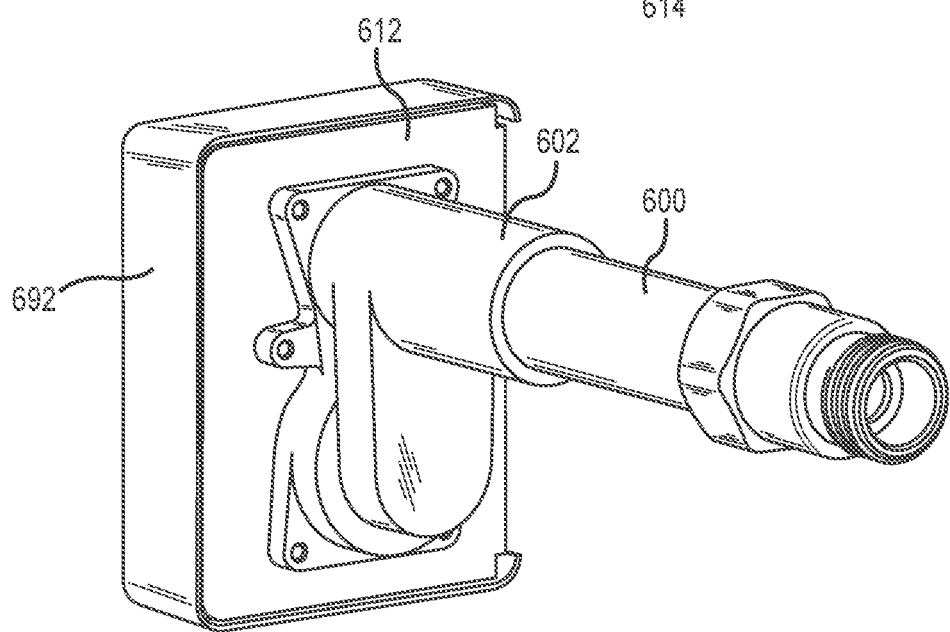
FIG. 36 is a rear perspective view of the enclosure shown in FIG. 35.
Figure 37:
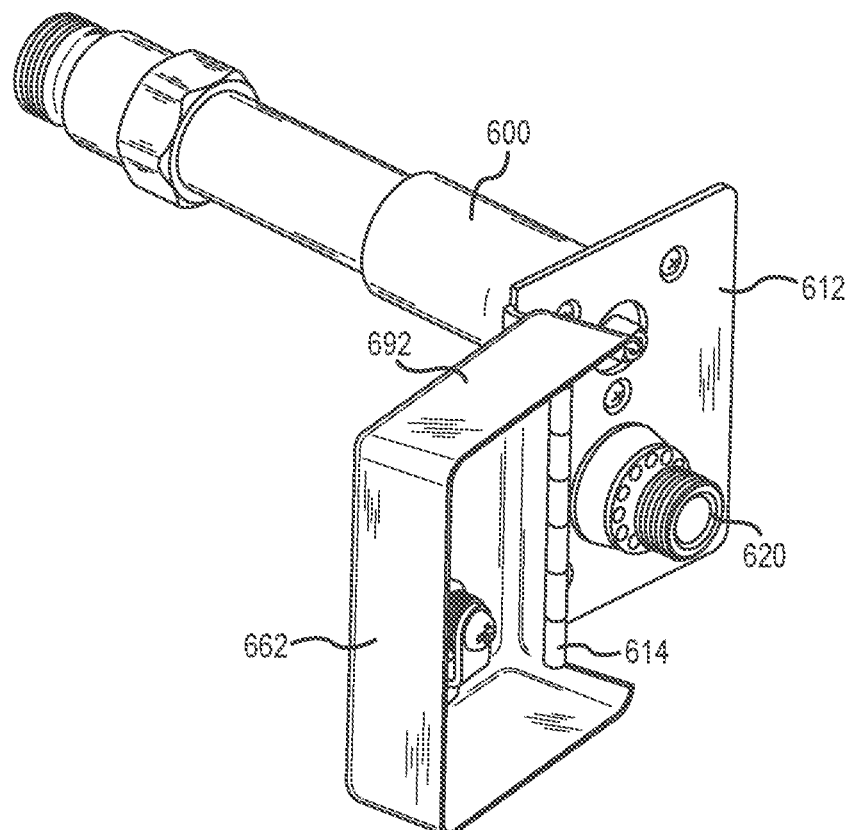
FIG. 37 is a front perspective view of the enclosure shown in FIG. 35 with the door open.
Figure 38:
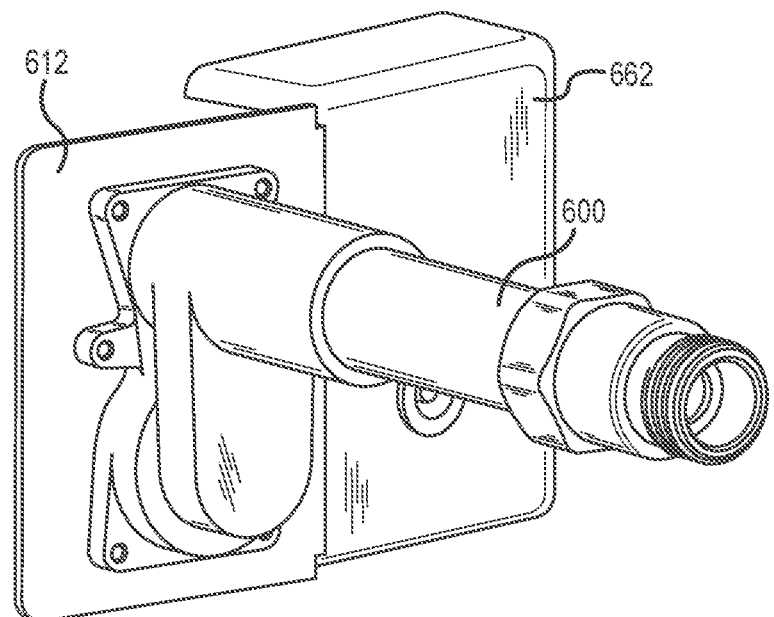
FIG. 38 is a rear perspective view of the enclosure shown in FIG. 35 with the door open.
Figure 39:
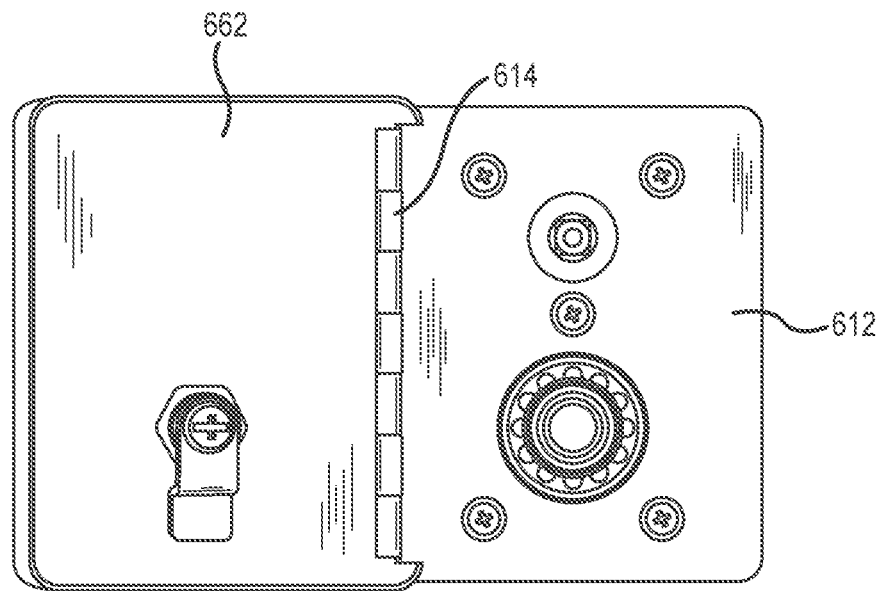
FIG. 39 is a front elevation view of the enclosure shown in FIG. 35 with the door open.
Figure 40:
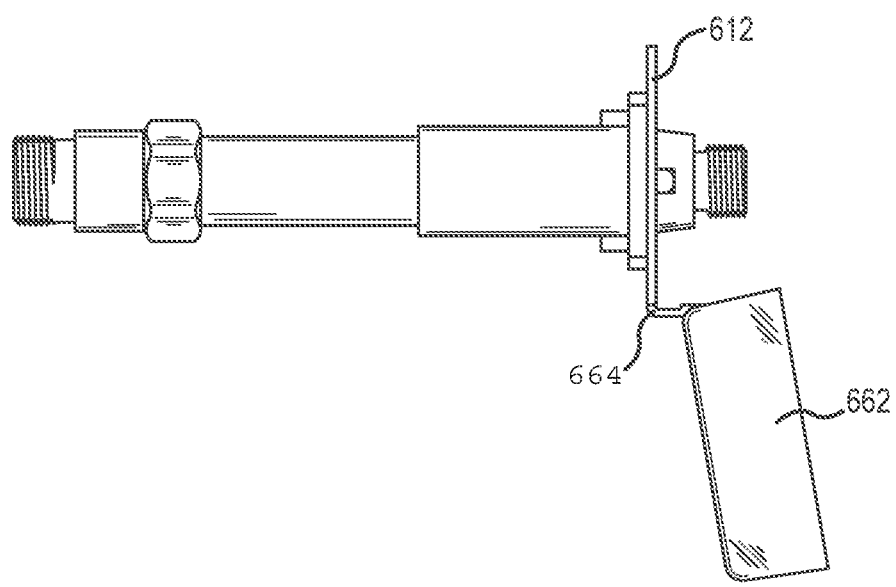
FIG. 40 is a top plan view of the enclosure shown in FIG. 35 with the door open.

FIGS. 34-40 illustrate how embodiments the present invention may be incorporated into existing hydrants. More specifically, FIG. 34 shows an existing hydrant assembly (Zurn model Z1310) made by design Zurn Industries, LLC. Zurn's hydrant includes a plate 512 that accommodates a backflow preventer 620 and a stem screw assembly 628. The plate 612 is interconnected to a housing 602 by a plurality of fasteners 606. In one embodiment of the present invention, a hinge plate 664 is provided that includes a hinge is also interconnected to a door 662. The door 662 may include a lock 678. The hinge plate 664 is interconnected to the plate 612 by removing one or more fasteners 606 and abutting a portion of the hinge plate 664 onto the front surface or rear surface of the plate 612. Thus the existing hardware is repurposed such that a door 662 can be utilized.

In other embodiments, however, the plate 612 is discarded and a new plate having an integral hinge plate and door is provided. The new plate with a hinge plate may also include a means for interfacing with the lock 678. Stated differently, some embodiments contemplate removing an existing plate of a to-be-installed, or installed, hydrant and replacing it with a new plate having an integral hinge plate and door.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed:

1. A hydrant enclosure comprising:
   a plate comprising a front surface and a rear surface and at least partially defining a first recess, wherein the first recess is configured to receive at least a backflow preventer;
   a pocket, at least partially defining a pocket recess, wherein the pocket recess extends rearward from the front surface of the plate past the rear surface of the plate, and wherein the pocket recess is defined by an opening through the plate and by at least two walls integral with the rear surface of the plate;
   a door comprising a proximal end, a distal end, an inner surface, and an outer surface, and wherein the door is positionable in at least a closed position, an open position, and a stowed position; and
   a protrusion configured to receive at least a fluid supply tube;
   wherein when the door is in the closed position, the inner surface of the door abuts the front surface of the plate at the distal end;
   wherein when the door is in the open position, the distal end is spaced from the front surface of the plate, and the proximal end is hingedly connected to the plate; and
   wherein when the door is in the stowed position, the proximal end is retracted into the pocket recess past the rear surface of the plate.

2. The hydrant enclosure of claim 1, wherein the plate at least partially defines a second recess configured to receive a stem screw.

3. The hydrant enclosure of claim 1, wherein the door comprises a lock.

4. The hydrant enclosure of claim 1, further comprising a boss configured to receive at least a control tube.

5. The hydrant enclosure of claim 1, wherein, when the door is in the closed position and a backflow preventer is installed in the first recess, the door conceals the backflow preventer.

6. The hydrant enclosure of claim 1, wherein the pocket recess extends farther rearward from the front surface of the plate than the boss.

7. A hydrant comprising:
   a plate comprising a front surface and a rear surface and at least partially defining a first recess, wherein the first recess is configured to receive at least a backflow preventer;
   a protrusion extending rearward from the rear surface of the plate;
   a fluid supply tube coupled to the protrusion;
   a valve for controlling fluid flow through the fluid supply tube;
   a pocket, at least partially defining a pocket recess, wherein the pocket recess extends rearward from the front surface of the plate past the rear surface of the plate, and wherein the pocket recess is defined by at least two walls integral with the rear surface of the plate; and
   a door comprising a proximal end, a distal end, an inner surface, and an outer surface, and wherein the door is positionable in at least a closed position, an open position, and a stowed position;
   wherein when the door is in the closed position, the inner surface of the door abuts the front surface of the plate at the distal end;
   wherein when the door is in the open position, the distal end is spaced from the front surface of the plate, and the proximal end is hingedly connected to the plate; and
   wherein when the door is in the stowed position, the proximal end is retracted into the pocket recess past the rear surface of the plate.

8. The hydrant of claim 7, further comprising:
   a control tube connected to the plate;
   a stem screw;
   a control rod, operatively connected to the stem screw and to the valve.

9. The hydrant of claim 8, wherein the plate at least partially defines a second recess configured to receive the stem screw.

10. The hydrant of claim 7, further comprising:
    at least one boss configured to receive at least a control tube; and
    a conduit, fluidly connecting the fluid supply tube to an opening in the protrusion.

11. The hydrant of claim 10, wherein the control tube is interconnected to the valve.

12. The hydrant of claim 7, wherein the door comprises a lock.

13. The hydrant enclosure of claim 7, wherein, when the door is in the closed position and the backflow preventer is installed in the first recess, the door conceals the backflow preventer.

14. The hydrant of claim 7, wherein the pocket recess extends farther rearward from the front surface of the plate than the protrusion.

15. A hydrant comprising:
    a plate comprising a front surface and a rear surface and at least partially defining a first recess and a second recess, wherein the first recess is configured to receive at least a backflow preventer and the second recess is configured to receive at least a stem screw;

a protrusion extending rearward from the rear surface of the plate;

a fluid supply tube coupled to the protrusion; a control tube coupled to the plate;

a valve, coupled to the fluid supply tube and the control tube for controlling fluid flow through the fluid supply tube;

a pocket, at least partially defining a pocket recess, wherein the pocket recess extends rearward from the front surface of the plate past the rear surface of the plate, and wherein the pocket recess is defined by an opening through the plate and by at least two walls integral with the rear surface of the plate; and a door comprising a proximal end, a distal end, an inner surface, and an outer surface, and wherein the door is positionable in at least a closed position, an open position, and a stowed position;

wherein when the door is in the closed position, the inner surface of the door abuts the front surface of the plate at the distal end;

wherein when the door is in the open position, the distal end is spaced from the front surface of the plate, and the proximal end is hingedly connected to the plate; and wherein when the door is in the stowed position, the proximal end is retracted into the pocket recess past the rear surface of the plate.

16. The hydrant of claim 15, further comprising:

the backflow preventer connected to the plate and positioned within the first recess;

the stem screw connected to the plate and positioned within the second recess; and a control rod, operatively connected to the stem screw and to the valve.

17. The hydrant of claim 15, wherein the door comprises a lock.

18. The hydrant of claim 16, wherein when the door is in the closed position, the door conceals the backflow preventer and stem screw.

19. The hydrant of claim 15, wherein the pocket recess extends farther rearward from the front surface of the plate than the protrusion.

20. The hydrant of claim 15, further comprising:

at least one boss configured to receive at least a control tube; and a conduit, fluidly connecting the fluid supply tube to an opening in the protrusion.

* * * * *